US012099571B2

(12) United States Patent
Yan et al.

(10) Patent No.: US 12,099,571 B2
(45) Date of Patent: Sep. 24, 2024

(54) FEATURE EXTRACTIONS TO MODEL LARGE-SCALE COMPLEX CONTROL SYSTEMS

(71) Applicant: General Electric Company, Schenectady, NY (US)

(72) Inventors: Weizhong Yan, Clifton Park, NY (US); Lalit Keshav Mestha, North Colonie, NY (US); Daniel Francis Holzhauer, Burnt Hills, NY (US)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 877 days.

(21) Appl. No.: 15/984,896

(22) Filed: May 21, 2018

(65) Prior Publication Data

US 2019/0219994 A1 Jul. 18, 2019

Related U.S. Application Data

(60) Provisional application No. 62/618,970, filed on Jan. 18, 2018.

(51) Int. Cl.
 G06F 18/213 (2023.01)
 G05B 13/02 (2006.01)
 (Continued)

(52) U.S. Cl.
 CPC ......... G06F 18/213 (2023.01); G05B 13/027 (2013.01); G05B 23/024 (2013.01);
 (Continued)

(58) Field of Classification Search
 CPC ........ G06N 3/08; G06N 20/00; G05B 13/027; G05B 23/024; G05B 23/0254; G06F 18/213; G06F 2218/08
 See application file for complete search history.

(56) References Cited

U.S. PATENT DOCUMENTS 9,454,733 B1 * 9/2016 Purpura ................ G06N 20/00
9,466,032 B2 10/2016 Düll et al.
(Continued)

FOREIGN PATENT DOCUMENTS

EP 3239884 A1 4/2017

OTHER PUBLICATIONS

Shila et al., "Catching Anomalous Distributed Photovoltaics: An Edge-based Multi-modal Anomaly Detection" Sep. 26, 2017, pp. 1-13. (Year: 2017).*
(Continued)

Primary Examiner — Miranda M Huang
Assistant Examiner — Chase P. Hinckley
(74) Attorney, Agent, or Firm — Buckley, Maschoff & Talwalkar LLC

(57) ABSTRACT

Heterogeneous monitoring nodes may each generate a series of monitoring node values over time associated with operation of an industrial asset. An offline abnormal state detection model creation computer may receive the series of monitoring node values and perform a feature extraction process using a multi-modal, multi-disciplinary framework to generate an initial set of feature vectors. Then feature dimensionality reduction is performed to generate a selected feature vector subset. The model creation computer may derive digital models through a data-driven machine learning modeling method, based on input/output variables identified by domain experts or by learning from the data. The system may then automatically generate domain level features based on a difference between sensor measurements and digital model output. A decision boundary may then be automatically calculated and output for an abnormal state detection model based on the selected feature vector subset and the plurality of derived generated domain level features.

20 Claims, 19 Drawing Sheets

(51) Int. Cl.
  *G05B 23/02* (2006.01)
  *G06N 3/008* (2023.01)
(52) U.S. Cl.
  CPC ...... *G05B 23/0254* (2013.01); *G06F 2218/08* (2023.01); *G06N 3/008* (2013.01)

(56) References Cited

U.S. PATENT DOCUMENTS

| | | | |
|---|---|---|---|
| 9,691,034 B2 | 6/2017 | Lee et al. | |
| 9,773,210 B2* | 9/2017 | Yu | G06N 20/00 |
| 10,104,100 B1* | 10/2018 | Bogorad | H04L 63/1425 |
| 10,187,326 B1* | 1/2019 | Anand | G06F 5/01 |
| 10,272,572 B2* | 4/2019 | Podnar | B25J 13/085 |
| 10,373,073 B2* | 8/2019 | Kisilev | G06N 20/00 |
| 10,397,255 B1* | 8/2019 | Bhalotra | H04L 63/1416 |
| 10,419,269 B2* | 9/2019 | Danichev | H04L 63/1416 |
| 10,474,932 B2* | 11/2019 | Fineis | G06K 9/00 |
| 10,572,659 B2* | 2/2020 | Ferragut | H04L 63/1425 |
| 10,585,123 B2* | 3/2020 | Nakayama | G01R 22/066 |
| 10,685,008 B1* | 6/2020 | Kurve | G06F 16/23 |
| 10,692,004 B1* | 6/2020 | Segev | G06N 3/08 |
| 10,749,883 B1* | 8/2020 | Martin | G06F 21/554 |
| 10,762,440 B1* | 9/2020 | Garg | G01S 13/867 |
| 10,826,902 B1* | 11/2020 | Aksu | H04L 63/0876 |
| 10,866,939 B2* | 12/2020 | Danichev | G06F 11/0751 |
| 10,872,149 B1* | 12/2020 | Alexander | G06F 21/566 |
| 10,931,692 B1* | 2/2021 | Mota | H04L 63/1425 |
| 10,931,694 B2* | 2/2021 | Villella | H04L 63/20 |
| 11,157,782 B2* | 10/2021 | Bathen | G06K 9/6284 |
| 11,222,046 B2* | 1/2022 | Zhang | G06N 20/20 |
| 2008/0133550 A1 | 6/2008 | Orangi et al. | |
| 2009/0234899 A1* | 9/2009 | Kramer | G06F 16/2465 708/200 |
| 2012/0316835 A1* | 12/2012 | Maeda | G01D 3/08 702/183 |
| 2015/0346066 A1* | 12/2015 | Dutta | G01M 99/008 702/183 |
| 2015/0363925 A1* | 12/2015 | Shibuya | F01D 21/14 345/440 |
| 2016/0259857 A1 | 9/2016 | Wang et al. | |
| 2016/0328654 A1* | 11/2016 | Bauer | G06F 18/24 |
| 2016/0378076 A1* | 12/2016 | Hill | G05B 13/026 700/28 |
| 2017/0310690 A1 | 10/2017 | Mestha et al. | |
| 2017/0314961 A1* | 11/2017 | Chen | G06F 11/3072 |
| 2017/0316342 A1* | 11/2017 | Franc | G06N 20/10 |
| 2017/0359366 A1 | 12/2017 | Bushey et al. | |
| 2018/0038954 A1* | 2/2018 | Deshpande | G08B 13/1672 |
| 2018/0082058 A1* | 3/2018 | Ferragut | G06F 21/552 |
| 2018/0115561 A1* | 4/2018 | Sun | H04L 63/1416 |
| 2018/0240016 A1* | 8/2018 | Shon | G06N 3/08 |
| 2018/0248904 A1* | 8/2018 | Villella | H04L 63/1425 |
| 2018/0248905 A1* | 8/2018 | Cote | G06F 17/18 |
| 2018/0267088 A1* | 9/2018 | Quellec | G01S 3/043 |
| 2018/0275642 A1* | 9/2018 | Tajima | G05B 23/024 |
| 2018/0308013 A1* | 10/2018 | O'Shea | G06N 20/00 |
| 2019/0034497 A1* | 1/2019 | Song | G06F 16/2477 |
| 2019/0098034 A1* | 3/2019 | Wakasugi | G06T 7/13 |
| 2019/0138938 A1* | 5/2019 | Vasseur | H04L 41/147 |
| 2019/0188065 A1* | 6/2019 | Anghel | G06N 3/0427 |
| 2019/0197238 A1* | 6/2019 | Canedo | G06F 21/554 |
| 2019/0220336 A1* | 7/2019 | Maya | G06F 11/0775 |
| 2019/0238396 A1* | 8/2019 | Tedaldi | H04L 41/0654 |
| 2019/0253440 A1* | 8/2019 | Mathur | G06F 21/554 |
| 2019/0260768 A1* | 8/2019 | Mestha | H04L 63/1466 |
| 2019/0272470 A1* | 9/2019 | Bandi | G06K 9/6253 |
| 2019/0327259 A1* | 10/2019 | DeFelice | H04L 63/1433 |
| 2019/0340392 A1* | 11/2019 | Khorrami | G06N 20/00 |
| 2019/0347577 A1* | 11/2019 | Ba | G06N 20/00 |
| 2019/0383705 A1* | 12/2019 | Smart | G01H 1/00 |
| 2020/0169085 A1* | 5/2020 | Becher | G06Q 10/0631 |
| 2020/0334228 A1* | 10/2020 | Matyska | G06F 16/278 |

OTHER PUBLICATIONS

Pajic et al., "Design and Implementation of Attack-Resilient Cyberphysical Systems" Mar. 17, 2017, pp. 66-81. (Year: 2017).*
Christ et al., "Distributed and parallel time series feature extraction for industrial big data applications" May 19, 2017, pp. 1-36. (Year: 2017).*
Zhou et al., "Design and Analysis of Multimodel-Based Anomaly Intrusion Detection Systems in Industrial Process Automation" Oct. 2015, pp. 1345-1360. (Year: 2015).*
Bose et al., "Detecting Insider Threats Using Radish: A System for Real-Time Anomaly Detection in Heterogeneous Data Streams" Jun. 2017, pp. 471-482. (Year: 2017).*
Ahmad et al., "Unsupervised real-time anomaly detection for streaming data" Jun. 2, 2017, pp. 134-147. (Year: 2017).*
Kim et al., "Squeezed Convolutional Variational Autoencoder for Unsupervised Anomaly Detection in Edge Device Industrial Internet of Things" Dec. 18, 2017. (Year: 2017).*
Muralidhar et al., "illiad: IntelLigent Invariant and Anomaly Detection in Cyber-Physical Systems" Jan. 29, 2018, pp. 1-20. (Year: 2018).*
Ntalampiras, Stavros, "Detection of Integrity Attacks in Cyber-Physical Critical Infrastructures Using Ensemble Modeling" Feb. 2015, pp. 104-111. (Year: 2015).*
Das et al., "Incorporating Feedback into Tree-based Anomaly Detection" Aug. 2017. (Year: 2017).*
Junejo et Goh, "Behaviour-Based Attack Detection and Classification in Cyber Physical Systems Using Machine Learning" 2016, pp. 34-43. (Year: 2016).*
Lyu et al., "Fog-Empowered Anomaly Detection in IoT Using Hyperellipsoidal Clustering" Oct. 2017, pp. 1174-1184. (Year: 2017).*
Chalapathy et al., "Robust, Deep, and Inductive Anomaly Detection" Jul. 30, 2017, pp. 1-16. (Year: 2017).*
Heo et al., "Improving Knowledge Distillation with Support Adversarial Samples" May 15, 2018. (Year: 2018).*
Malhotra et al., "LSTM-based Encoder-Decoder for Multi-sensor Anomaly Detection" Jul. 11, 2016. (Year: 2016).*
Anwar et al., "Ensuring Data Integrity of OPF Module and Energy Database by Detecting Changes in Power Flow Patterns in Smart Grids" Dec. 2017, pp. 3299-3311. (Year: 2017).*
Miao et al., "Coding Schemes for Securing Cyber-Physical Systems Against Stealthy Data Injection Attacks" Mar. 2017, pp. 106-117. (Year: 2017).*
McNamara et al., "Developing a comprehensive framework for multimodal feature extraction" Feb. 20, 2017. (Year: 2017).*
Sabokrou et al., "Deep-Cascade: Cascading 3D Deep Neural Networks for Fast Anomaly Detection and Localization in Crowded Scenes" Mar. 9, 2017, pp. 1992-2004. (Year: 2017).*
DeVries et Taylor, "Dataset Augmentation in Feature Space" Feb. 17, 2017, pp. 1-12. (Year: 2017).*
Volpi et al., "Adversarial Feature Augmentation for Unsupervised Domain Adaptation" Nov. 23, 2017. (Year: 2017).*
Rana et al., "Microgrid Protection and Control Through Reliable Smart Grid Communication System" Nov. 2016. (Year: 2016).*
Tuor et al., "Recurrent Neural Network Language Models for Open Vocabulary Event-Level Cyber Anomaly Detection" Dec. 2, 2017, arXiv: 1712.00557. (Year: 2017).*
Ghafouri et al., "Adversarial Regression for Detecting Attacks in Cyber-Physical Systems" Apr. 30, 2018. (Year: 2018).*
Cheng et al., "Ranking Causal Anomalies for System Fault Diagnosis via Temporal and Dynamical Analysis on Vanishing Correlations" Jun. 2017, pp. 1-28. (Year: 2017).*
Park et al., "A Multimodal Anomaly Detector for Robot-Assisted Feeding Using an LSTM-based Variational Autoencoder" Nov. 2, 2017, arXiv: 1711.00614v1, pp. 1-8. (Year: 2017).*
Lesi et al., "Network Scheduling for Secure Cyber-Physical Systems" 2017, pp. 45-55. (Year: 2017).*
Zhou et Paffenroth "Anomaly Detection with Robust Deep Autoencoders" Aug. 2017, pp. 665-674. (Year: 2017).*
Mestha et al., "Cyber-attack Detection and Accommodation Algorithm for Energy Delivery Systems" Aug. 2017, pp. 1326-1331. (Year: 2017).*

(56) References Cited

OTHER PUBLICATIONS

Huang et al., "An Online Defense Framework against Cyber Attacks on Automatic Generation Control" Dec. 15, 2017, arXiv: 1712.06417v1, pp. 1-8. (Year: 2017).*
Jamei et al., "Automated Anomaly Detection in Distribution Grids using uPMU Measurements" Sep. 30, 2016, arXiv: 1610.01107v1, pp. 1-10. (Year: 2016).*
Jamei et al., "Anomaly Detection using Optimally-Placed uPMU Sensors in Distribution Grids" Aug. 1, 2017, arXiv: 1708.00118v1v1, pp. 1-11. (Year: 2017).*
El Chamie et al., "Physics-Based Features for Anomaly Detection in Power Grids with Micro-PMUs" May 20, 2018, pp. 1-7. (Year: 2018).*
Brown et al., "Recurrent Neural Network Attention Mechanisms for Interpretable System Log Anomaly Detection" Mar. 13, 2018. (Year: 2018).*
Ezeme et al., "An Imputation-based Augmented Anomaly Detection from Large Traces of Operating System Events" Dec. 2017, pp. 43-52. (Year: 2017).*
Liu et al., "An unsupervised spatiotemporal graphical modeling approach to anomaly detection in distributed CPS" 2016. (Year: 2016).*
Tang et al., "Dynamic Event Monitoring Using Unsupervised Feature Learning Towards Smart Grid Big Data" 2017, pp. 1480-1487. (Year: 2017).*
Teng et al., "Anomaly Detection in Dynamic Networks using Multi-view Time-Series Hypersphere Learning" Nov. 2017, pp. 827-836. (Year: 2017).*
Wang et al., "An effective intrusion detection framework based on SVM with feature augmentation" Sep. 8, 2017, pp. 130-139. (Year: 2017).*
Wang et al., "Resilient Moving Horizon Estimation for Cyber-Physical Systems under Sensor Attacks" Dec. 2017, pp. 2274-2279. (Year: 2017).*
Zhao et al., "Parameter-Free Incremental Co-Clustering for Multi-Modal Data in Cyber-Physical-Social Systems" Nov. 7, 2017, IEEE, pp. 21852-21861. (Year: 2017).*
Dosovitsky et al., "Unsupervised feature learning by augmenting single images" Feb. 16, 2014, arXiv 1312.5242v3, pp. 1-7. (Year: 2014).*
Hauberg et al., "Dreaming More Data: Class-dependent Distributions over Diffeomorphisms for Learned Data Augmentation" Jun. 30, 2016, pp. 1-9. (Year: 2016).*
Chen et al., "Detection and Classification of Transmission Line Faults Based on Unsupervised Feature Learning and Convolutional Sparse Autoencoder" Apr. 19, 2018, IEEE, pp. 1748-1758. (Year: 2018).*
Chen et al., "A Framework for Automatically Extracting Overvoltage Features Based on Sparse Autoencoder" Feb. 16, 2018, IEEE, pp. 594-604. (Year: 2018).*
Zhou et al., "Abnormal Event Detection with High Resolution micro-PMU Data" Jun. 20, 2016, pp. 1-7. (Year: 2016).*
Niazazari et Livani, "A PMU-data-driven disruptive event classification in distribution systems" Jan. 4, 2018, pp. 251-260. (Year: 2018 ).*
Kumar, Ravi "(73) Lessons to learn from the failure of GE's IoT Platform, Predix?" Jul. 31, 2019, pp. 1-3. (Year: 2019).*
Liu et al., "Contextual Outlier Interpretation" Nov. 28, 2017, arXiv: 1711.10589v1, pp. 1-10. (Year: 2017).*
Solarz et al., "Automated novelty detection in the WISE survey with one-class support vector machines" Jul. 19, 2017, arXiv: 1706.06389v2, pp. 1-14. (Year: 2017).*
Chalapathy et al., "Anomaly Detection using One-class Neural Networks" Feb. 18, 2018, arXiv: 1802.06360v1, pp. 1-9. (Year: 2018).*
Pavy et al., "SV-Means: A Fast SVM-Based Level Set Estimator for Phase-Modulated Radar Waveform Classification" Feb. 2018, pp. 1-11. (Year: 2018).*
Clark et al., "An Impact-Aware Defense against Stuxnet" Jun. 2013, pp. 1-8. (Year: 2013).*
Logan et al., "Multimodal Attribute Extraction" Nov. 29, 2017, arXiv: 1711.11118v1, pp. 1-7. (Year: 2017).*
Yadav et al., "ODE—Augmented Training Improves Anomaly Detection in Sensor Data from Machines" May 5, 2016, arXiv: 1605.01534, pp. 1-5. (Year: 2016).*
Ritika et Rao, "Data Augmentation of Railway Images for Track Inspection" Feb. 5, 2018, arXiv: 1802.01286, pp. 1-7. (Year: 2018).*
Niazazari et Livani, "A PMU-based-data-driven disruptive event classification in distribution systems" Jan. 4, 2018, pp. 251-260. (Year: 2018).*
Liu et al., "Regression-based Online Anomaly Detection for Smart Grid Data" Jun. 18, 2016, arXiv: 1606.05781v1, pp. 1-11. (Year: 2016).*
Zhou et al., "Partial Knowledge Data-driven Event Detection for Power Distribution Networks" Mar. 13, 2017, pp. 1-12. (Year: 2017).*
Zhou et al., "Abnormal Event Detection with High Resolution micro-PMU Data" 2016, pp. 1-7. (Year: 2016).*
Lee et Wright, "Using Neural Networks to Detect Line Outages from PMU Data" Mar. 27, 2018, arXiv: 1710.05916v2, pp. 1-14. (Year: 2018).*
Yang et al., "A Novel PMU Fog based Early Anomaly Detection for an Efficient Wide Area PMU Network" May 9, 2018, arXiv: 1805.03573v1, pp. 1-10. (Year: 2018).*
Khodabandehlou et al., "Anomaly Classification in Distribution Networks Using a Quotient Gradient System" May 14, 2018, arXiv: 1805.04979v1, pp. 1-8. (Year: 2018).*
Li et al., "Adaptive Online Monitoring of Voltage Stability Margin via Local Regression" 2017, IEEE, pp. 701-713. (Year: 2017).*
Zhou et al., "Partial Knowledge Data-driven Event Detection for Power Distribution Networks" Mar. 2017, IEEE, pp. 1-11. (Year: 2017).*
Bai et al., "Confidence Interval Estimates for Loading Margin Sensitivity for Voltage Stability Monitoring in the Presence of Renewable Energy" 2016, pp. 1-5. (Year: 2016).*
Tang et al., "Dynamic Event Monitoring using Unsupervised Feature Learning Towards Smart Grid Big Data" 2017, IEEE, pp. 1480-1487. (Year: 2017).*
Zhou et al., "A Hierarchical Method for Transient Stability Prediction of Power Systems using the Confidence of a SVM-Based Ensemble Classifier" Sep. 27, 2016, pp. 1-20. (Year: 2016).*
Malbasa et al., "Voltage Stability Prediction using Active Machine Learning" 2017, IEEE, pp. 3117-3124. (Year: 2017).*
Yan, Weizhong et al., "On Accurate and Reliable Anomaly Detection for Gas Turbine Combustors: A Deep Learning Approach", General Electric Global Research Center, Niskayuna, New York, General Electric Power & Water Engineering, Atlanta, Georgia, Oct. 31, 2015, 8 pp.
Luo, Hui et al., "Gas turbine engine gas path anomaly detection using deep learning with Gaussian distribution", 2017 Prognostics and System Health Management Conference, IEEE, Jul. 9, 2017, 6 pp.
Gabriel, Michau et al., "Deep Feature Learning Network for Fault Detection and Isolation", Zurich University of Applied Science, Winterthur, Switzerland & General Electric Switzerland, Baden, Switzerland, Oct. 9, 2017, 11 pp.
"Communication—European Search Report" for EP Application No. 18204058.4, dated Apr. 16, 2019, 10 pp.
Mantere, Matti et al., "Feature Selection for Machine Learning Based Anomaly Detection in Industrial Control System Networks", 2012 IEEE International Conference on Green Computing and Communications, Nov. 20-23, 2012, DOI: 10.1109/GreenCom.2012.127, (pp. 771-774, 4 total pages).
Liao, Shu et al., "Representation Learning: A Unified Deep Learning Framework for Automatic Prostate MR Segmentation", International Conference on Medical Image Computing and Computer-Assisted Intervention, 2013, (pp. 254-261, 8 total pages).
McNamara, Quinten et al., "Developing a Comprehensive Framework for Multimodal Feature Extraction", Proceedings of the 23rd ACM SIGKDD International Conference on Knowledge Discovery

(56) References Cited

OTHER PUBLICATIONS and Data Mining, Aug. 13-17, 2017, DOI: 10.1145,3097983.3098075, (pp. 1567-1574, 8 total pages).

\* cited by examiner

| GAS TURBINE IDENTIFIER 1802 | INITIAL FEATURE SET 1804 | SELECTED FEATURE SUBSET 1806 | FEATURE TYPE 1808 |
|---|---|---|---|
| GT_1001 | | | DOMAIN LEVEL |
| GT_1001 | | | DATA-DRIVEN |

*FIG. 18*

FEATURE EXTRACTIONS TO MODEL LARGE-SCALE COMPLEX CONTROL SYSTEMS

CROSS-REFERENCE TO RELATED APPLICATIONS

The present application claims the benefit of U.S. Provisional Patent Application No. 62/618,970 entitled "FEATURE EXTRACTIONS TO MODEL LARGE-SCALE COMPLEX CONTROL SYSTEMS" and filed Jan. 18, 2018. The entire content of that application is incorporated herein by reference.

At least one embodiment described herein was made with Government support under contract number DE-OE0000833 awarded by the Department of Energy. The Government has certain right in at least one embodiment described herein.

BACKGROUND

Industrial control systems that operate physical systems (e.g., associated with power turbines, jet engines, locomotives, autonomous vehicles, etc.) are increasingly connected to the Internet. As a result, these control systems have been increasingly vulnerable to threats, such as cyber-attacks (e.g., associated with a computer virus, malicious software, etc.), that could disrupt electric power generation and distribution, damage engines, inflict vehicle malfunctions, etc. Current methods primarily consider attack detection in Information Technology ("IT," such as, computers that store, retrieve, transmit, manipulate data) and Operation Technology ("OT," such as direct monitoring devices and communication bus interfaces). Cyber-attacks can still penetrate through these protection layers and reach the physical "domain" as seen in 2010 with the Stuxnet attack. Such attacks can diminish the performance of a control system and may cause total shut down or catastrophic damage to a plant. Currently, no methods are available to automatically detect, during a cyber-incident, attacks at the domain layer where sensors, controllers, and actuators are located. In some cases, multiple attacks may occur simultaneously (e.g., more than one actuator, sensor, or parameter inside control system devices might be altered maliciously by an unauthorized party at the same time). Note that some subtle consequences of cyber-attacks, such as stealthy attacks occurring at the domain layer, might not be readily detectable (e.g., when only one monitoring node, such as a sensor node, is used in a detection algorithm). It may also be important to determine when a monitoring node is experiencing a fault (as opposed to a malicious attack) and, in some cases, exactly what type of fault is occurring. Existing approaches to protect an industrial control system, such as failure and diagnostics technologies, may not adequately address these problems—especially when multiple, simultaneous attacks and/faults occur since such multiple faults/failure diagnostic technologies are not designed for detecting stealthy attacks in an automatic manner. It would therefore be desirable to protect an industrial asset from cyber-attacks in an automatic and accurate manner even when attacks percolate through the IT and OT layers and directly harm control systems.

SUMMARY

According to some embodiments, heterogeneous monitoring nodes may each generate a series of monitoring node values over time associated with operation of an industrial asset. An offline abnormal state detection model creation computer may receive the series of monitoring node values and perform a feature extraction process using a multi-modal, multi-disciplinary framework to generate an initial set of feature vectors. The model creation computer may then perform feature dimensionality reduction to generate a selected feature vector subset. The model creation computer may also derive digital models through a data-driven machine learning modeling method, based on input/output variables identified by domain experts or by learning from the data. The system may then automatically generate domain level features based on a difference between sensor measurements and digital model outputs. A decision boundary may then be automatically calculated and output for an abnormal state detection model based on the selected feature vector subset and the plurality of generated domain level features.

Some embodiments comprise: means for receiving, by an offline abnormal state detection model creation computer, a series of monitoring node values over time from a plurality of heterogeneous monitoring nodes associated with operation of an industrial asset; means for performing a feature extraction process using a multi-modal, multi-disciplinary framework to generate an initial set of feature vectors; means for performing feature dimensionality reduction to generate a selected feature vector subset; means for deriving digital models through a data-driven machine learning modeling method, based on input/output variables identified by domain experts or by learning from the data; means for automatically generating domain level features based on a difference between sensor measurements and digital model output; and means for automatically calculating and outputting at least one decision boundary for an abnormal state detection model based on the selected feature vector subset and the plurality of generated domain level features.

Some technical advantages of some embodiments disclosed herein are improved systems and methods to protect an industrial asset from cyber-attacks in an automatic and accurate manner.

BRIEF DESCRIPTION OF THE DRAWINGS

FIG. 18 is a tabular portion of an alert database according to some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
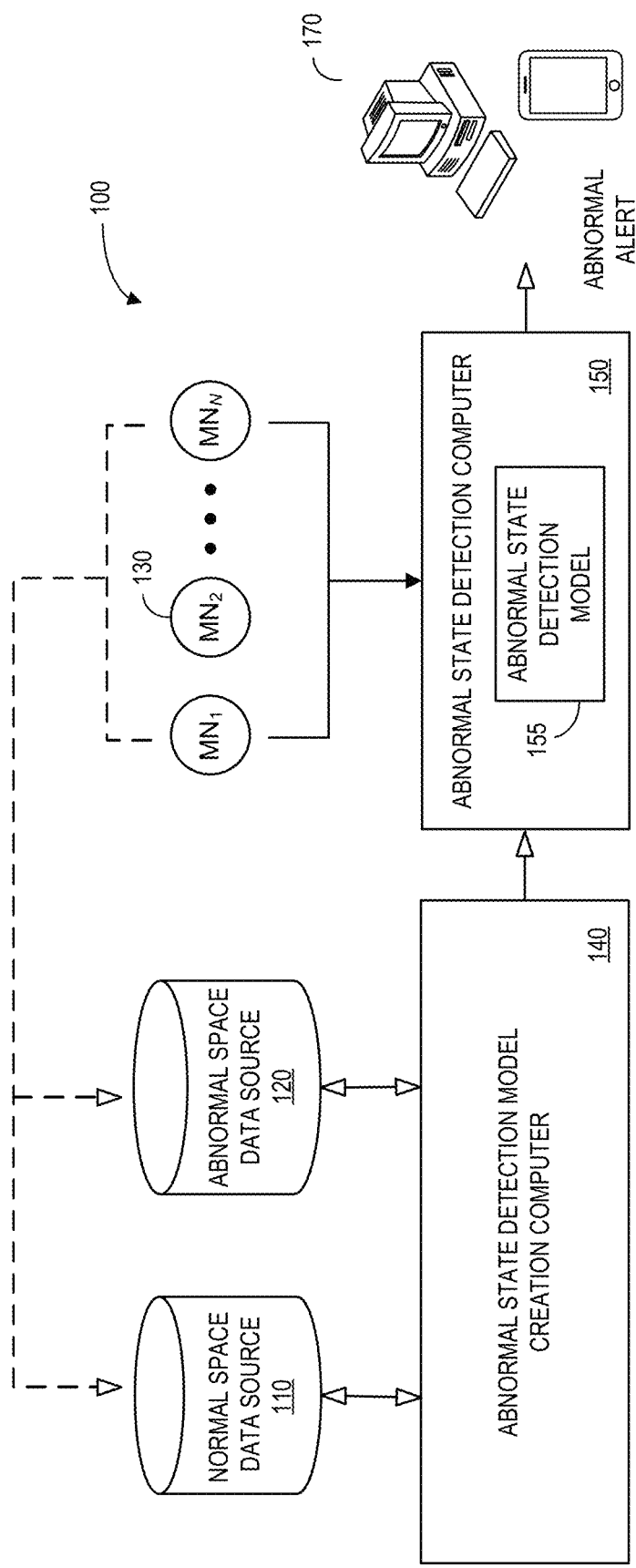
FIG. 1 is a high-level block diagram of a system that may be provided in accordance with some embodiments.

Industrial assets that operate physical systems are increasingly connected to the Internet. As a result, these control systems may be vulnerable to threats and existing approaches to protect an industrial asset, such as FDIA approaches, might not adequately address these threats. It would therefore be desirable to protect an industrial asset from malicious intent such as cyber-attacks in an automatic and accurate manner. FIG. 1 is a high-level architecture of a system 100 in accordance with some embodiments. The system 100 may include a "normal space" data source 110 and an "abnormal space" data source 120. The normal space data source 110 might store, for each of a plurality of heterogeneous "monitoring nodes" 130 (shown in FIG. 1 as "MN$_1$," "MN$_2$," ... "MN$_N$" for "1, 2, ... N" different monitoring nodes), a series of normal values over time that represent normal operation of an industrial asset (e.g., generated by a model or collected from actual monitoring node 130 data as illustrated by the dashed line in FIG. 1). As used herein, the phrase "monitoring node" might refer to, for example, sensor data, signals sent to actuators and auxiliary equipment, intermediary parameters that are not direct sensor signals, and/or control logical(s). These may represent, for example, threat monitoring nodes that receive data from the threat monitoring system in a continuous fashion in the form of continuous signals or streams of data or combinations thereof. Moreover, the nodes 130 may be used to monitor occurrences of cyber-threats or other abnormal events. This data path may be designated specifically with encryptions or other protection mechanisms so that the information may be secured and cannot be tampered with via cyber-attacks. The abnormal space data source 120 might store, for each of the monitoring nodes 130, a series of abnormal values that represent an abnormal operation of the industrial asset (e.g., when the system is experiencing a cyber-attack). According to some embodiments, the monitoring nodes 130 provide "heterogeneous" data. That is, the data may represent information from widely diverse areas or domains.

Information from the normal space data source 110 and the abnormal space data source 120 may be provided to an offline abnormal state detection model creation computer 140 that uses this data to create a decision boundary (that is, a boundary that separates normal behavior from abnormal behavior). The decision boundary may then be used by an abnormal state detection computer 150 executing an abnormal state detection model 155. The abnormal state detection model 155 may, for example, monitor streams of data from the monitoring nodes 130 comprising data from sensor nodes, actuator nodes, and/or any other critical monitoring nodes (e.g., monitoring nodes MN$_1$ through MN$_N$), calculate at least one "feature" for each monitoring node based on the received data, and "automatically" output a threat alert signal to one or more remote monitoring devices 170 when appropriate (e.g., for display to a user). According to some embodiments, a threat alert signal might be transmitted to a unit controller, a plant Human-Machine Interface ("HMI"), or to a customer via a number of different transmission methods. Note that one receiver of a threat alert signal might be a cloud database that correlates multiple attacks on a wide range of gas turbine assets. As used herein, the term "feature" may refer to, for example, mathematical characterizations of data. Examples of features as applied to data might include the maximum, minimum, mean, standard deviation, variance, range, current value, settling time, Fast Fourier Transform ("FFT") spectral components, linear and non-linear principal components, independent components, sparse coding features, deep learning features, etc. Moreover, term "automatically" may refer to, for example, actions that can be performed with little or no human intervention. According to some embodiments, information about a detected threat may be transmitted back to the industrial asset.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The offline abnormal state detection model creation computer 140 may store information into and/or retrieve information from various data stores, such as the normal space data source 110 and/or the abnormal space data source 120. The various data sources may be locally stored or reside remote from the offline abnormal state detection model creation computer 140 (which might be associated with, for example, offline or online learning). Although a single offline abnormal state detection model creation computer 140 is shown in FIG. 1, any number of such devices may be included. Moreover, various devices described herein might be combined according to embodiments of the present invention. For example, in some embodiments, the offline abnormal state detection model creation computer 140 and one or more data sources 110, 120 might comprise a single apparatus. The offline abnormal state detection model creation computer 140 functions may be performed by a constellation of networked apparatuses, in a distributed processing or cloud-based architecture.

A user may access the system 100 via one of the monitoring devices 170 (e.g., a Personal Computer ("PC"), tablet, or smartphone) to view information about and/or manage threat information in accordance with any of the embodiments described herein. In some cases, an interactive graphical display interface may let a user define and/or adjust certain parameters (e.g., abnormal state detection trigger levels) and/or provide or receive automatically generated recommendations or results from the offline abnormal state detection model creation computer 140 and/or abnormal state detection computer 150.

Figure 2:
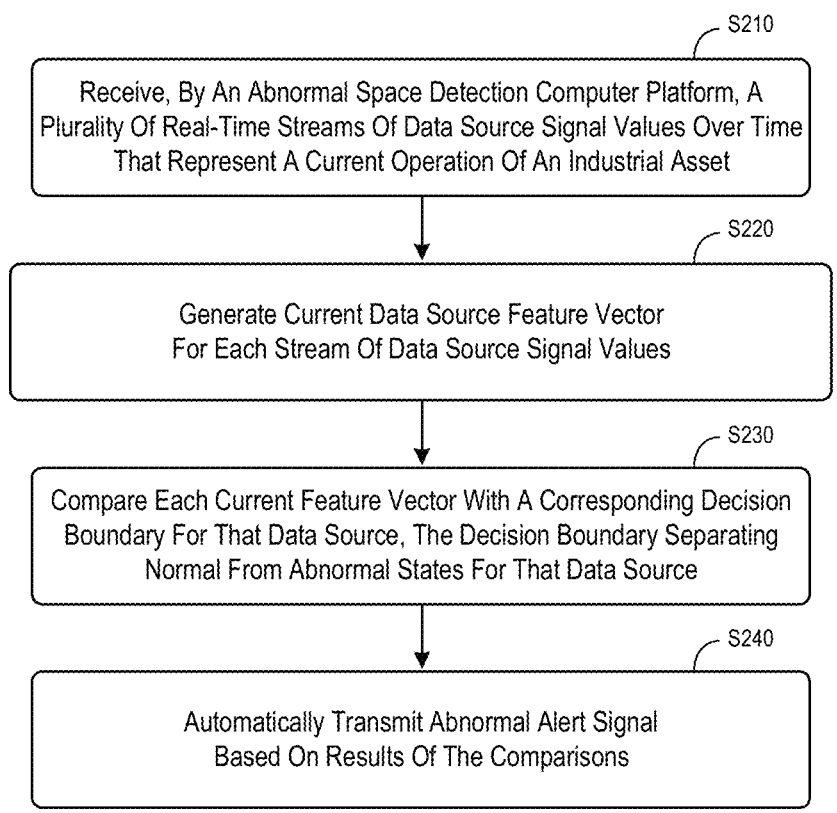
FIG. 2 is a method according to some embodiments.

For example, FIG. 2 illustrates a method that might be performed by some or all of the elements of the system 100 described with respect to FIG. 1. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a plurality of real-time heterogeneous monitoring node signal inputs may receive streams of monitoring node signal values over time that represent a current operation of an industrial asset. At least one of the monitoring nodes (e.g., controller nodes, etc.) may be associated with, for example, sensor data, an auxiliary equipment input signal, a control intermediary parameter, and/or a control logic value. The industrial asset might be associated with, for example, a gas turbine, electric power grid, dam, locomotive, airplane, one or more autonomous vehicles, etc.

At S220, a real-time threat detection computer platform may receive the streams of monitoring node signal values and, for each stream of monitoring node signal values, generate a current monitoring node feature vector. According to some embodiments, at least one of the current monitoring node feature vectors is associated with principal components, statistical features, deep learning features, frequency domain features, time series analysis features, logical features, geographic or position based locations, and/or interaction features.

At S230, each generated current monitoring node feature vector may be compared to a corresponding decision boundary (e.g., a linear boundary, non-linear boundary, multi-dimensional boundary, etc.) for that monitoring node in substantially real-time, the decision boundary separating a normal state from an abnormal state for that monitoring node. According to some embodiments, at least one monitoring node is associated with a plurality of multi-dimensional decision boundaries and the comparison at S230 is performed in connection with each of those boundaries. Note that a decision boundary might be generated, for example, in accordance with a feature-based learning algorithm and a high fidelity model or a normal operation of the industrial asset. Moreover, at least one decision boundary may exist in a multi-dimensional space and be associated with a dynamic model which is constructed using data obtained from design of experiments such as, a full factorial design, Taguchi screening design, a central composite methodology, a Box-Behnken methodology, and a real-world operating conditions methodology. In addition, an abnormal state detection model associated with a decision boundary might, according to some embodiments, be dynamically obtained and adapted based on a transient condition, a steady state model of the industrial asset, and/or data sets obtained while operating the system as in self-learning systems from incoming data stream.

At S240, the system may automatically transmit an abnormal alert signal (e.g., a notification message, etc.) based on results of the comparisons performed at S230. The abnormal state might be associated with, for example, an actuator attack, a controller attack, a monitoring node attack, a plant state attack, spoofing, physical damage, unit availability, a unit trip, a loss of unit life, and/or asset damage requiring at least one new part. According to some embodiments, one or more response actions may be performed when an abnormal alert signal is transmitted. For example, the system might automatically shut down all or a portion of the industrial asset (e.g., to let the detected potential cyber-attack be further investigated). As other examples, one or more parameters might be automatically modified, a software application might be automatically triggered to capture data and/or isolate possible causes, etc. Note that a threat alert signal might be transmitted via a cloud-based system, such as the PREDIX® field agent system. Note that according to some embodiments, a cloud approach might also be used to archive information and/or to store information about boundaries.

According to some embodiments, the system may further localize an origin of the threat to a particular monitoring node. For example, the localizing may be performed in accordance with a time at which a decision boundary associated with one monitoring node was crossed as compared to a time at which a decision boundary associated with another monitoring node was crossed. According to some embodiments, an indication of the particular monitoring node might be included in the abnormal alert signal.

Some embodiments described herein may take advantage of the physics of a control system by learning a priori from tuned high fidelity equipment models and/or actual "on the job" data to detect single or multiple simultaneous adversarial threats to the system. Moreover, according to some embodiments, all monitoring node data may be converted to features using advanced feature-based methods, and the real-time operation of the control system may be monitoring in substantially real-time. Abnormalities may be detected by classifying the monitored data as being "normal" or disrupted (or degraded). This decision boundary may be constructed using dynamic models and may help to enable early detection of vulnerabilities (and potentially avert catastrophic failures) allowing an operator to restore the control system to normal operation in a timely fashion.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with DoE techniques. Moreover, multiple algorithmic methods (e.g., support vector machines, one of the machine learning techniques) may be used to generate decision boundaries. Since boundaries may be driven by measured data (or data generated from high fidelity models), defined boundary margins may help to create a threat zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account an operator's knowledge about system operation (e.g., the differences between normal and abnormal operation).

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Note that a deep learning technique might be associated with, for example, an auto-encoder, a de-noising auto-encoder, a restricted Boltzmann machine, etc. Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple monitoring nodes and specific locations). Embodiments may incorporate any number of features, with more features allowing the approach to become more accurate as the system learns more about the physical process and threat. According to some embodiments, dissimilar values from monitoring nodes may be normalized to unit-less space, which may allow for a simple way to compare outputs and strength of outputs.

Thus, some embodiments may provide an advanced anomaly detection algorithm to detect cyber-attacks on, for example, key gas turbine sensors. The algorithm may identify which signals(s) are being attacked using monitoring node-specific decision boundaries and may inform a control system to take accommodative actions. In particular, a detection and localization algorithm might detect whether a sensor, auxiliary equipment input signal, control intermediary parameter, or control logical are in a normal or anomalous state.

Some embodiments of the algorithm may utilize feature-based learning techniques based on high fidelity physics models and/or machine operation data (which would allow the algorithm to be deployed on any system) to establish a high dimensional decision boundary. As a result, detection may occur with more precision using multiple signals, making the detection more accurate with less false positives. Moreover, embodiments may detect multiple attacks on monitoring node data, and rationalize where the root cause attack originated. For example, the algorithm may decide if a signal is anomalous because of a previous signal attack, or if it is instead independently under attack. This may be accomplished, for example, by monitoring the evolution of the features as well as by accounting for time delays between attacks.

Figure 3:
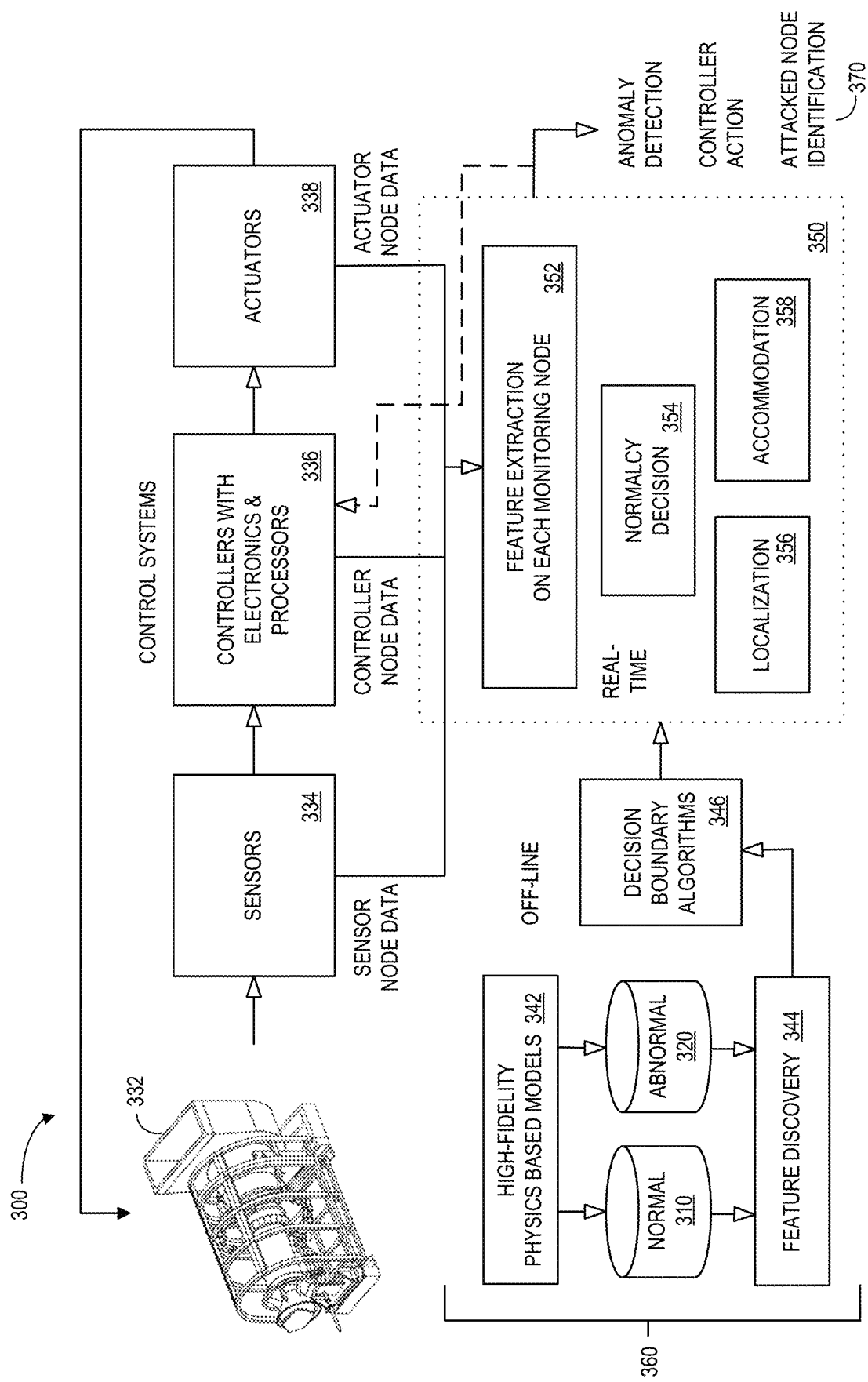
FIG. 3 is threat alert system in accordance with some embodiments.

A cyber-attack detection and localization algorithm may process a real-time gas turbine signal data stream and then compute features (multiple identifiers) which can then be compared to the sensor specific decision boundary. A block diagram of a system 300 utilizing a sensor specific gas turbine cyber-attack detection and localization algorithm according to some embodiments is provided in FIG. 3. In particular, a gas turbine 332 provides information to sensors 334 which helps controllers with electronics and processors 336 adjust actuators 338. An offline abnormal state detection system 360 may include one or more high-fidelity physics based models 342 associated with the gas turbine 332 to create normal data 310 and/or abnormal data 320. The normal data 310 and abnormal data 320 may be accessed by a feature discovery component 344 and processed by decision boundary algorithms 346 while off-line (e.g., not necessarily while the gas turbine 332 is operating). The decision boundary algorithms 346 may generate a threat model including decision boundaries for various monitoring nodes. Each decision boundary may separate two data sets in a high dimensional space which is constructed by running a binary classification algorithm, such as a support vector machine using the normal data 310 and abnormal data 320 for each monitoring node signal (e.g., from the sensors 334, controllers 336, and/or the actuators 338).

A real-time threat detection platform 350 may receive the boundaries along with streams of data from the monitoring nodes. The platform 350 may include a feature extraction on each monitoring node element 352 and a normalcy decision 354 with an algorithm to detect attacks in individual signals using sensor specific decision boundaries, as well rationalize attacks on multiple signals, to declare which signals were attacked, and which became anomalous due to a previous attack on the system via a localization module 356. An accommodation element 358 may generate outputs 370, such as an anomaly decision indication (e.g., threat alert signal), a controller action, and/or a list of attacked monitoring nodes.

During real-time detection, contiguous batches of monitoring node data may be processed by the platform 350, normalized and the feature vector extracted. The location of the vector for each signal in high-dimensional feature space may then be compared to a corresponding decision boundary. If it falls within the attack region, then a cyber-attack may be declared. The algorithm may then make a decision about where the attack originally occurred. An attack may sometimes be on the actuators 338 and then manifested in the sensors 334 data. Attack assessments might be performed in a post decision module (e.g., the localization element 356) to isolate whether the attack is related any of the sensor, controller, or actuator (e.g., indicating which part of the monitoring node). This may be done by individually monitoring, overtime, the location of the feature vector with respect to the decision boundary. For example, when a sensor 334 is spoofed, the attacked sensor feature vector will cross the decision boundary earlier than the rest of the vectors as described with respect to FIG. 4. If a sensor is declared to be anomalous, and the load command to the auxiliary equipment is later determined to be anomalous, it may be determined that the original attack, such as signal spoofing, occurred on the sensor 334. Conversely, if the signal to the auxiliary equipment was determined to be anomalous first, and then later manifested in the sensor 334 feedback signal, it may be determined that the signal to the equipment was initially attacked.

According to some embodiments, it may be detected whether or not a signal is in the normal operating space (or abnormal space) through the use of localized decision boundaries and real-time computation of the specific signal features. Moreover, an algorithm may differentiate between a sensor being attacked as compared to a signal to auxiliary equipment being attacked. The control intermediary parameters and control logical(s) may also be analyzed using similar methods. Note that an algorithm may rationalize signals that become anomalous. An attack on a signal may then be identified.

Figure 4:
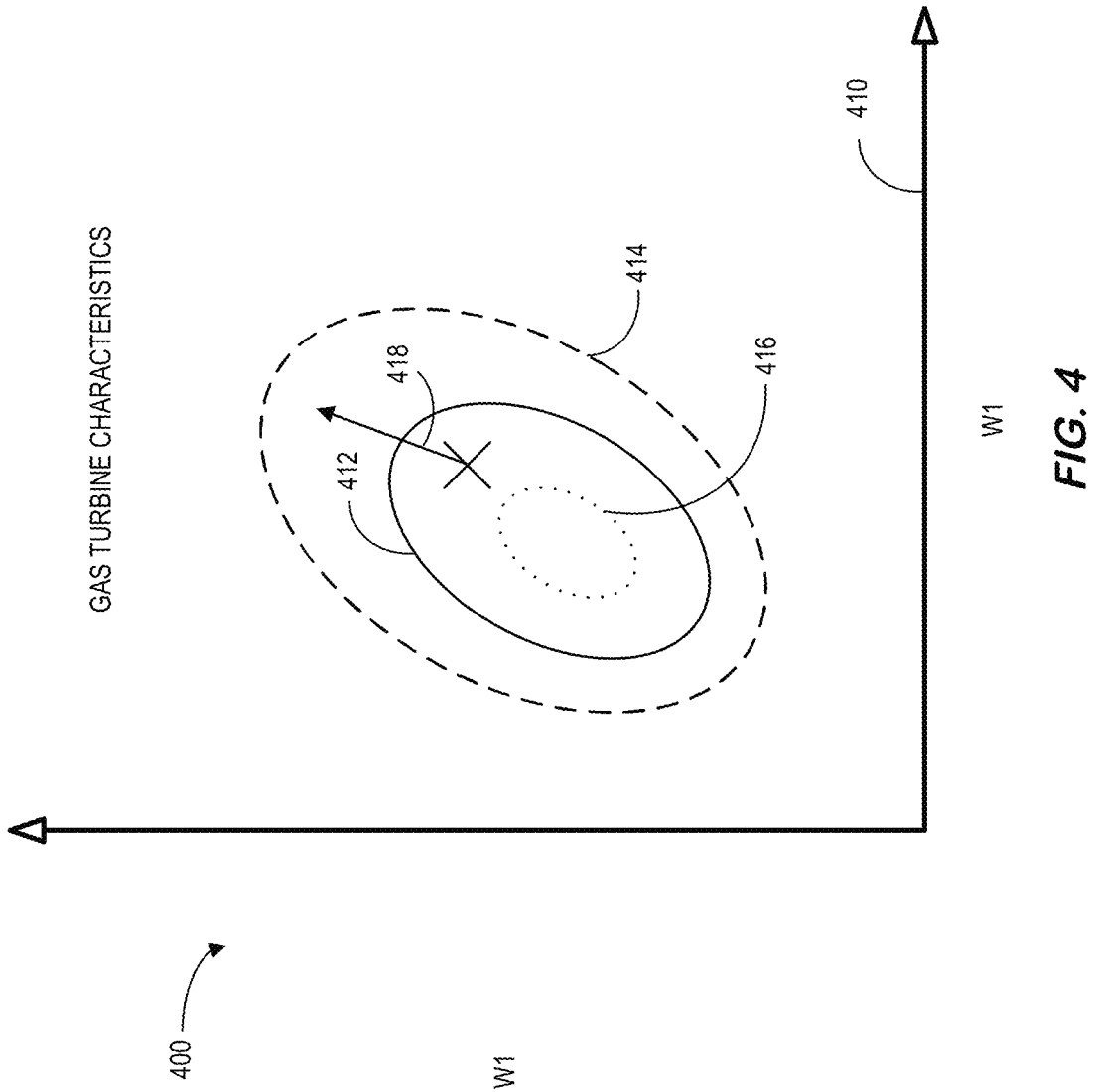
FIG. 4 illustrates boundaries and a feature vector for an industrial asset parameter according to some embodiments.

FIG. 4 illustrates 400 boundaries and a feature vector that might be associated with monitoring node parameters in accordance with some embodiments. In particular, a graph 410 includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") that is performed on the input data. PCA might be one of the features that might be used by the algorithm to characterize the data, but note that other features could be leveraged.

The graph includes a hard boundary 412 (solid curve), a minimum boundary 416 (dotted curve), and a maximum boundary 414 (dashed curve) and an indication associated with current feature location for the monitoring node parameter (illustrated with an "X" on the graph). As illustrated in FIG. 4, the current monitoring node location is between the minimum and maximum boundaries (that is, the "X" is between the dotted and dashed lines). As a result, the system may determine that the operation of the industrial asset is normal (and no threat is being detected indicating that the industrial asset is currently under attack).

Existing methods for detecting abnormal conditions in monitoring nodes are limited to FDIA (which itself is very limited). The cyber-attack detection and localization algorithms described herein can not only detect abnormal signals of sensors, but can also detect signals sent to auxiliary equipment, control intermediary parameters and/or control logical(s). The algorithm can also understand multiple signal attacks. One challenge with correctly identifying a cyber-attack threat is that it may occur with multiple sensors being impacted by malware nearly at once. According to some embodiments, an algorithm may identify in real-time that an attack has occurred, which sensor(s) are impacted, and declare a fault response. To achieve such a result, the detailed physical response of the system must be known to create acceptable decision boundaries. This might be accomplished, for example, by constructing data sets for normal and abnormal regions by running Design of Experiments ("DoE") experiments on high-fidelity models. A data set for each sensor might comprise a feature vector for given threat values. Full factorial, Taguchi screening, central composite and Box-Behnken are some of the known design methodologies used to create the attack space. When models are not available, these DoE methods are also used to collect data from real-world power generator systems. Experiments may be run at different combinations of simultaneous attacks. In some embodiments, the system may detect degraded/faulty operation as opposed to a cyber-attack. Such decisions might utilize a data set associated with a degraded/faulty operating space. At the end of this process, the system may create data sets such as "attack v/s normal" and "degraded v/s normal" for use while constructing decision boundaries. Further note that a decision boundary may be created for each signal using data sets in feature space. Various classification methods may be used to compute decision boundaries. For example, binary linear and non-linear supervised classifiers are examples of methods that could be used to obtain a decision boundary.

Note that embodiments might utilize temporal and/or spatial normalization. Temporal normalization may provide normalization along a time axis. Spatial normalization may be used to normalize signals along multiple nodes (e.g., sensor axis). In either case, the normalized signals may then be used to perform attack detection using feature extraction and comparisons to decision boundaries. Sensor, actuator, and controller node time-series data (as well as other types of data) may be processed in substantially real-time to extract "features" from this data. The feature data may then be compared to a decision boundary to determine if a cyber-attack has occurred to the system. A similar approach may be used for detecting attacks in spatially normalized data.

The processing of the real-time data may utilize a normal operating point of the industrial asset. This normal operating point might be determined, for example, based on system operating modes, external conditions, system degradation factors, etc. The real-time measured sensor data, actuator data, and controller nodes data may be processed such that a difference between actual and nominal values is computed and this difference, or delta, is normalized with the expected operating conditions coefficients.

Figure 5:
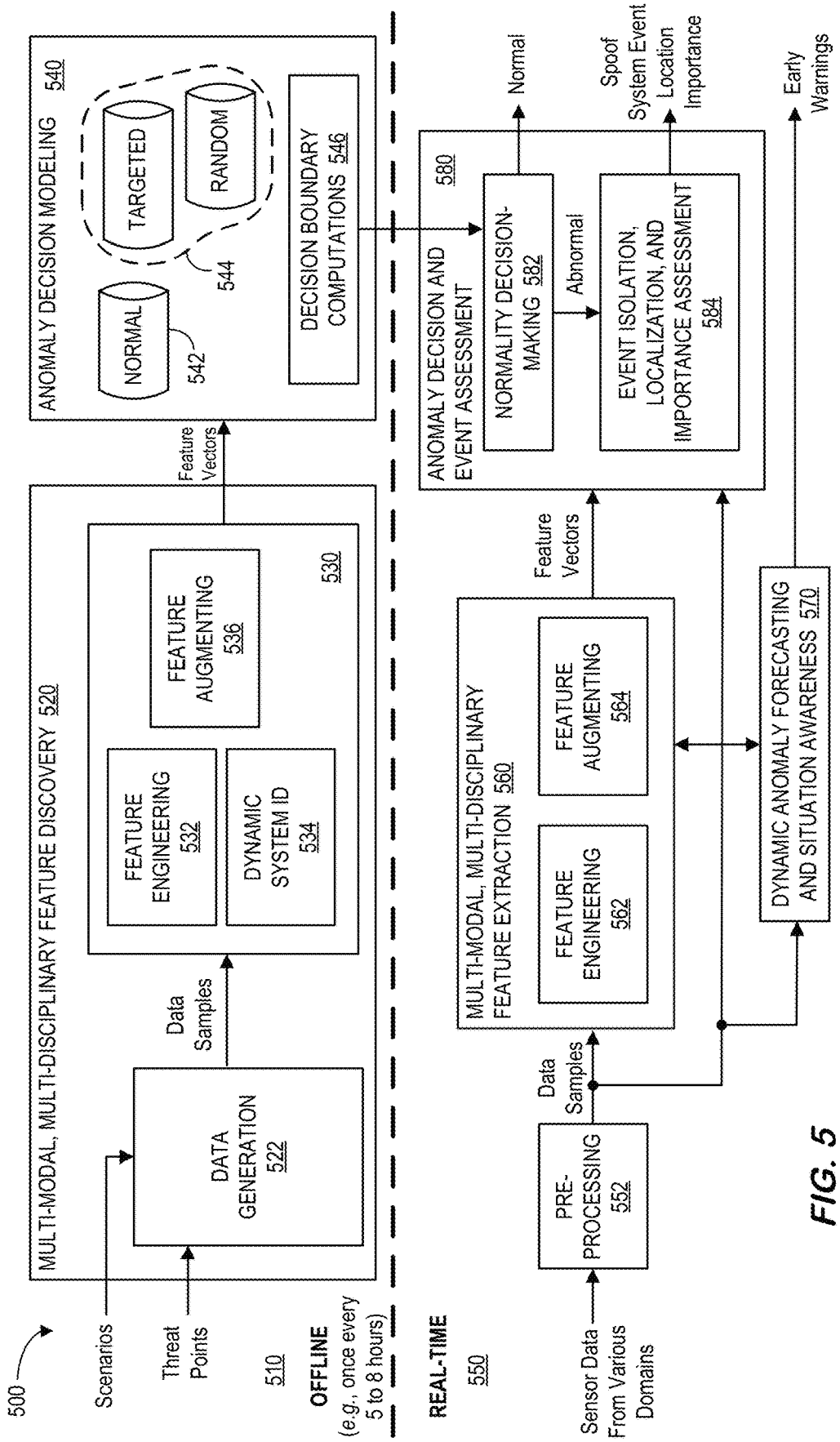
FIG. 5 is an offline and real-time anomaly decision and early warning tool architecture according to some embodiments.

FIG. 5 is an offline and real-time anomaly decision and early warning tool architecture 500 according to some embodiments. In particular, the architecture 500 includes an offline portion 510 (e.g., that performs calculations once every 6 to 8 hours) and a real-time portion 550. The offline portion 510 includes a Multi-Modal, Multi-Disciplinary ("MMMD") feature discovery element 520 that receives scenarios and threat points. The scenarios and threat points may, for example, be provided to a data generation element 522 (e.g., associated with an industrial asset model) that generates data samples that are provided to feature engineering 532, dynamic system identification 534, and/or feature augmenting 536 elements of a feature discovery element 530 that in turn provides feature vectors to an anomaly decision modeling system 540. The anomaly decision modeling system 540 may include normal data 542 and abnormal data 544 (e.g., targeted data and random data) that are used, along with the received feature vectors, by decision boundary computations 546 to output feature boundaries to an anomaly decision and event assessment element 580 in the real-time portion 550 of the architecture 500.

The real-time portion 550 of the architecture 500 may also include a pre-processing element 552 that receives information from homogeneous sources, such as sensor data from various domains. The pre-processing element 552 may then generate data samples that are provided to a Multi-Modal, Multi-Disciplinary ("MMMD") feature extraction unit 560 and a dynamic anomaly forecasting and situation awareness element 570 (e.g., to generate early warnings). The feature extraction unit 560 might include, for example, feature engineering 562 and feature augmenting 564, and provide feature vectors to the anomaly decision and event assessment element 580. According to some embodiments, the anomaly decision and event assessment element 580 includes normality decision making 582 (e.g., to generate a normal indication) and event isolation, localization, and importance assessment element 584 (e.g., to generate spoof indications, system event indications, location indications, importance indications, etc.).

According to some embodiments, the architecture 500 may implement a proposed framework that consists of two steps: (1) a feature-based model-assisted learning approach 510 for use in offline computation at a frequency of, for example, approximately four times a day; and (2) real-time, high speed detection process 550 (e.g., operating from approximately once every second to once every minute) that leverages heterogeneous data sources. The offline decision boundary tool 510 may use a physics-based industrial asset model (e.g., associated with the data generation element 522) to characterize different operation points as normal or abnormal conditions. The system may also flag abnormal events that may be associated with critical targets from a cybersecurity perspective. For this purpose, operation points may be defined to include normal operating points and any known vulnerabilities. The real-time tool 550 may use the decision boundary, various mapping functions built during the offline process 510 and real-time data from heterogeneous sensors to identify abnormal conditions from normal operation of the system.

The offline tool 510 might be run, for example, approximately two to four times per day, to represent an expected highest and lowest loading point for the industrial asset during that day. The power system model associated with the data generation element 522 may consist of network topology with power system components such as generators and transmission lines. Note that any of these physical grid assets may be potentially subject to a cyber-attack. According to some embodiments, synthetic data may be generated for a set of pre-determined operating points from several virtual sensors embedded in the model.

Figure 6:
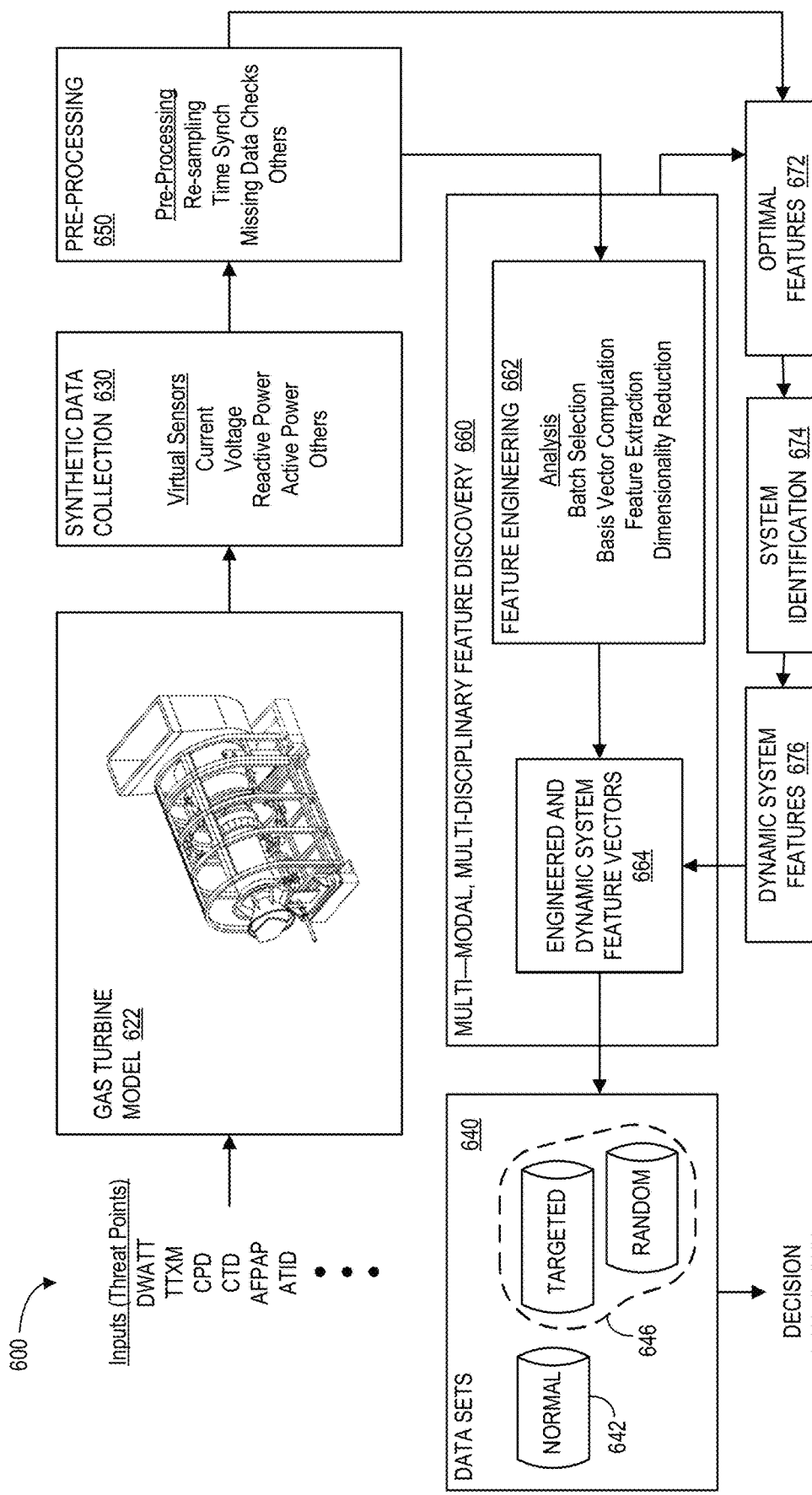
FIG. 6 is an offline anomaly decision boundary tool in accordance with some embodiments.

FIG. 6 is an offline anomaly decision boundary tool 600 in accordance with some embodiments. In particular, the tool 600 illustrates key steps used in a feature-based framework for offline computation. A gas turbine model 622 may receive inputs (e.g., threat points) associated with, for example, multiple domains (e.g., in the case of a gas turbine, global, fuel, and air control system domains). Synthetic data collection 630 (e.g., associated with virtual sensors, current, voltage, reactive power, active power, etc.) may receive information from the power system model and provide data to pre-processing 650. The pre-processing 650 might be associated with, for example, re-sampling, time synchronization, missing data checks, etc. and may help test a realistic scenario in a controlled simulation environment by creating abnormal scenarios for sensed data streams.

The pre-processed 650 sensor data is converted to salient features using a MMMD feature discovery framework 660 that may employ machine learning to identify knowledge-based, shallow, and/or deep features by maximally leveraging the conventional (e.g., existing) and unconventional data sources. Note that the MMMD feature discovery framework may be associated with feature engineering 662 (e.g., associated with analysis such as batch selection, basis vector computation, feature extraction, dimensionality reduction, etc.) and engineered and dynamic system feature vectors 664. Moreover, pre-processing 650 information may pass through optimal features 672, system identification 674, and/or dynamic system features 676 before being provided to the engineered and dynamic system feature vectors 664. The MMMD feature discovery framework 660 may, according to some embodiments, output data sets (e.g., normal data 642 and abnormal data 646 such as targeted data and random data) to be used to generate decision boundaries.

A subset of these features may be used for constructing a dynamic state space model in feature space that will model the time evolution of the features. This information may be augmented to the previous set of engineered feature vectors. Thus, the augmented feature vector may contain information from a physics-based model and the dynamic nature of the features themselves. For simplicity, time evolution with data from sensors within one processing batch might be utilized. According to some embodiments, feature maps (e.g., basis vectors, feature vector dimension, feature parameters, etc.) will be stored for use during real-time operation. Various possible threat scenarios may be simulated for a given operating condition, and the importance of these threat scenarios with respect to their impact on a power system phenomenon (e.g., voltage stability, inter-area oscillatory stability, etc.) may be quantified using a feature-based algorithm that exploits underlying network structure information. This may help characterize and rank the threats from the perspective of a large-scale power system phenomenon.

Figure 7:
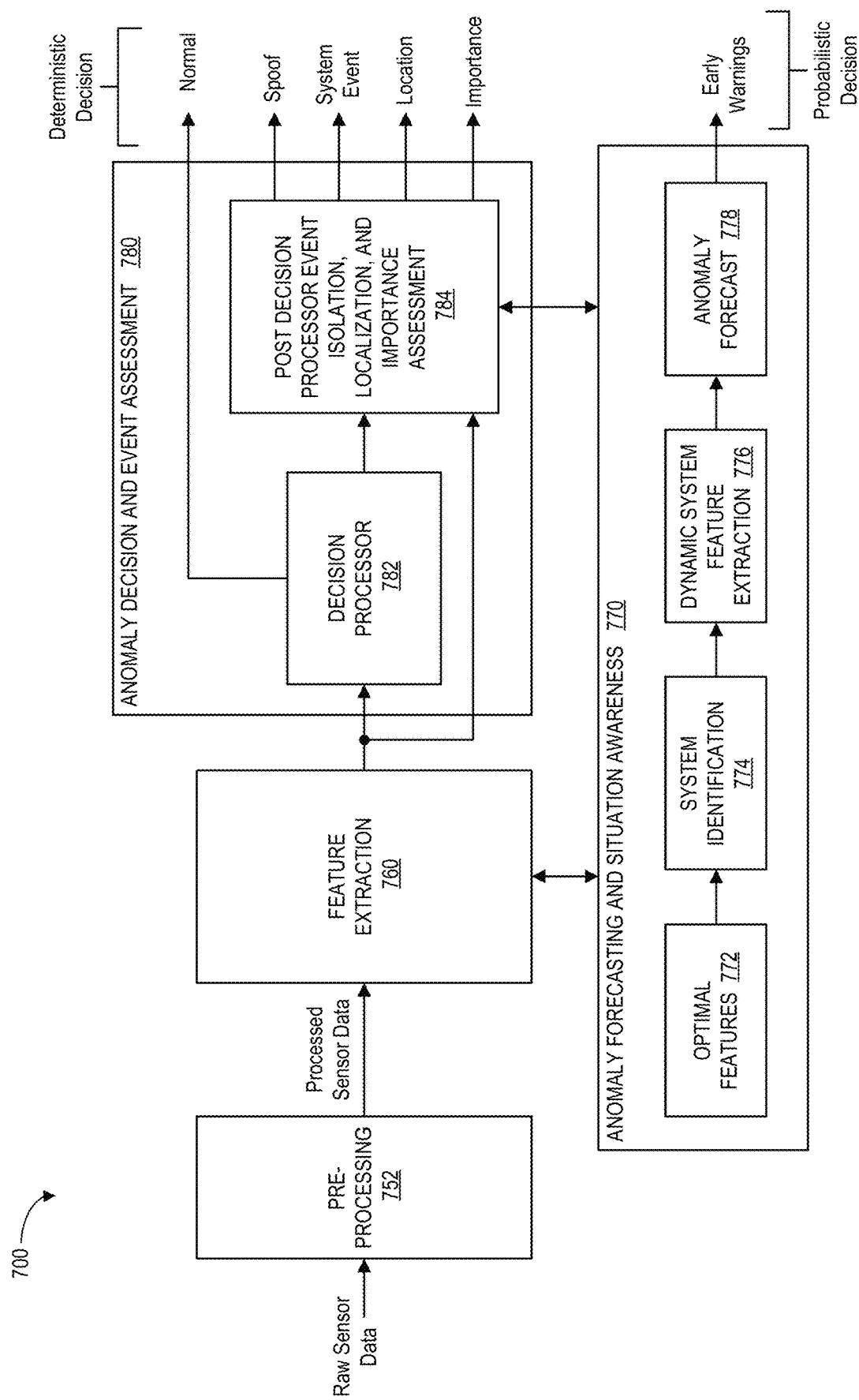
FIG. 7 illustrates a real-time decision, event/threat assessment, and early warning system according to some embodiments.

FIG. 7 illustrates a real-time decision, event/threat assessment, and early warning system 700 according to some embodiments. The real-time components may include, for example, pre-processing 752 (e.g., associated with resampling, time synchronization, missing data checks, conditioning, etc.) that receives raw sensor data and generates processed sensor data. A feature extraction unit 760 (e.g., associated with feature engineering for vector knowledge based shallow/deep learning and/or a feature augmenter for engineered and/or dynamic system feature vector functions) may receive the processed sensor data and provide information to a decision processor 782 of an anomaly decision and event assessment unit 780. The decision processor 782 may generate a normal indication (if appropriate) and/or provide abnormal data to a post decision processor event isolation, localization, and importance assessment module 784. The post decision processor event isolation, localization, and importance assessment unit 784 may, for example, receive communication network data, etc. and generate spoof indications, system event indications, location indications, importance indications, etc. (e.g., deterministic decisions). An anomaly forecasting and situation awareness engine 770 may include optimal features 772, system identification 774, dynamic system feature extraction 776, and/or an anomaly forecast element 778 to generate early warning indications for spoofs or systems events (e.g., probabilistic decisions).

In real-time, raw sensor data may be obtained from traditional power system sensors like Remote Terminal Units ("RTUs") and modern sensors like transmission and distribution Phasor Measurement Units ("PMUs"), micro-PMUs, Digital Fault Recorders ("DFRs"), and smart meters. This may be in addition to non-traditional sources like Wi-Fi activity, text messaging activity, cyber infrastructure status inputs, and/or social media and internet feeds. Pre-processing 752 may be performed to align the datasets and identify the possibility of data integrity attacks (e.g., associated with spoofing). In this step, the system may import various feature mapping functions generated in the offline decision boundary tool for use in real-time. This features set may be augmented further with salient features from the dynamic system by performing system identification on current and past select sets of optimal features. The dynamic system model may be updated, for example, in real-time for use in forecasting and situation awareness.

The augmented feature set may be comprised of both static and dynamic features and may be compared against the decision boundaries constructed from offline analysis so a decision can be made with a corresponding confidence interval. This feature set may also be used for the anomaly forecasting and situation awareness engine 770 to enable early warning of impending threats. If an abnormality is detected, the feature set may be further analyzed inside the post decision processing module 784. In this module 784, the abnormality event may be assessed further using both conventional and unconventional sensor data and classified as spoofing and bad data, a system event, a cyber-physical attack, etc. Note that this decision and classification may be considered deterministic in nature. The location and the criticality or importance of the said abnormality location may also be assessed using the bad data detection framework and complex network theory models developed during the offline computations. More probabilistic decisions might come from the anomaly forecasting and situation awareness engine 770 in which anomaly forecasting is done for early warning using updated dynamic state space models from real-time features.

According to some embodiments, data may be received in steams or batches. The anomaly decision and event assessment engine 770 of FIG. 7 may provide a deterministic decision about the system status (e.g., "normal," "spoofing," or "system event"). Before an anomaly happens, the deterministic system status may be "normal" and it may remain normal until an anomaly actually happens. The engine 770 may detect an anomaly once it happens and decide whether it a spoofing situation or a system event. The anomaly forecasting and situation awareness engine 770 may provide a probabilistic decision and generate early warnings for the gas turbine. At each time instant, a situation awareness block may project a current status into the future using a stochastic dynamic forecast. The probabilistic status may remain normal until the confidence interval of the normal status becomes sufficiently large (and the confidence level drops) that the situation warrants an early warning indication. Once an early warning is generated, future forecasting may continue with a probabilistic decision about whether an upcoming forecasted anomaly is an attack or a fault (with associated probabilities of occurrence for each). Between the time an early warning is generated and the time an anomaly actually happens, the confidence intervals of attack and fault may tighten (and the confidence levels may increase) until a minimum is reached (representing a maximum confidence) at the time of an actual anomaly (at which point the deterministic status may also reflect the anomaly). The future forecasting may still continue with the situation awareness block (with the confidence intervals naturally increasing as the prediction horizon expands).

As the system receives continuous updates from different sensors, the proposed framework and algorithms may flag any suspected abnormalities along with a confidence interval. A deterministic decision may represent a firm decision, whereas a probabilistic decision may be associated with a future forecast. In the deterministic decision, the system may provide the location and an assessment of the importance of the attack with respect to industrial asset. A gas turbine operator may then choose to view the location of the abnormality and/or the sensors that are feeding the abnormal data. The gas turbine operator may also decide to make further control selections as appropriate.

According to some embodiments, a complex network approach may help identify critical assets and nodes in a gas turbine in order to determine their vulnerability to malicious intent such as cyber-attacks. In such an approach, a power system model ("grid model") that represents the normal operating condition of the grid may be used. The power system model might consist of static network information such as network topology, impedance of power lines and transformers that connect the various buses and the generators and loads (e.g., represented as power injections at the respective buses). The power system model might be augmented with dynamic data such as sub-transient models for different generator assets, motor models for loads and other high-power power electronic devices. According to some embodiments, the gas turbine may be modeled using a full Differential-Algebraic Equation ("DAE") representation.

Note that in the framework described with respect to FIGS. 5 through 7, identifying salient features may be an important aspect of developing control optimization for dynamic systems as well as machine learning and data mining solutions. Extracting features from different data sources (e.g., time-series sensor measurements, text documents, event logs, etc.) is a way of leveraging information from different types of data sources (multiple "modalities") for improved performance. According to some embodiments, an MMMD feature discovery framework may generate features of features from different data sources. That is, in an integrated framework an initial vector of static features may be extracted (e.g., using machine learning techniques). Then, in order to capture the evolution of features over time, a dynamic model may be identified for an optimal subset of the original features, and dynamic model features (or "features of the features") may be extracted to be augmented as the overall feature vector. Note that features might be associated with a dynamic model comprising, for example, stability margins, controllability indices, observability indices, elements of an observability matrix, elements of a controllability matrix, poles, and/or zeros of the dynamic model of the evolution of features over time.

Figure 8:
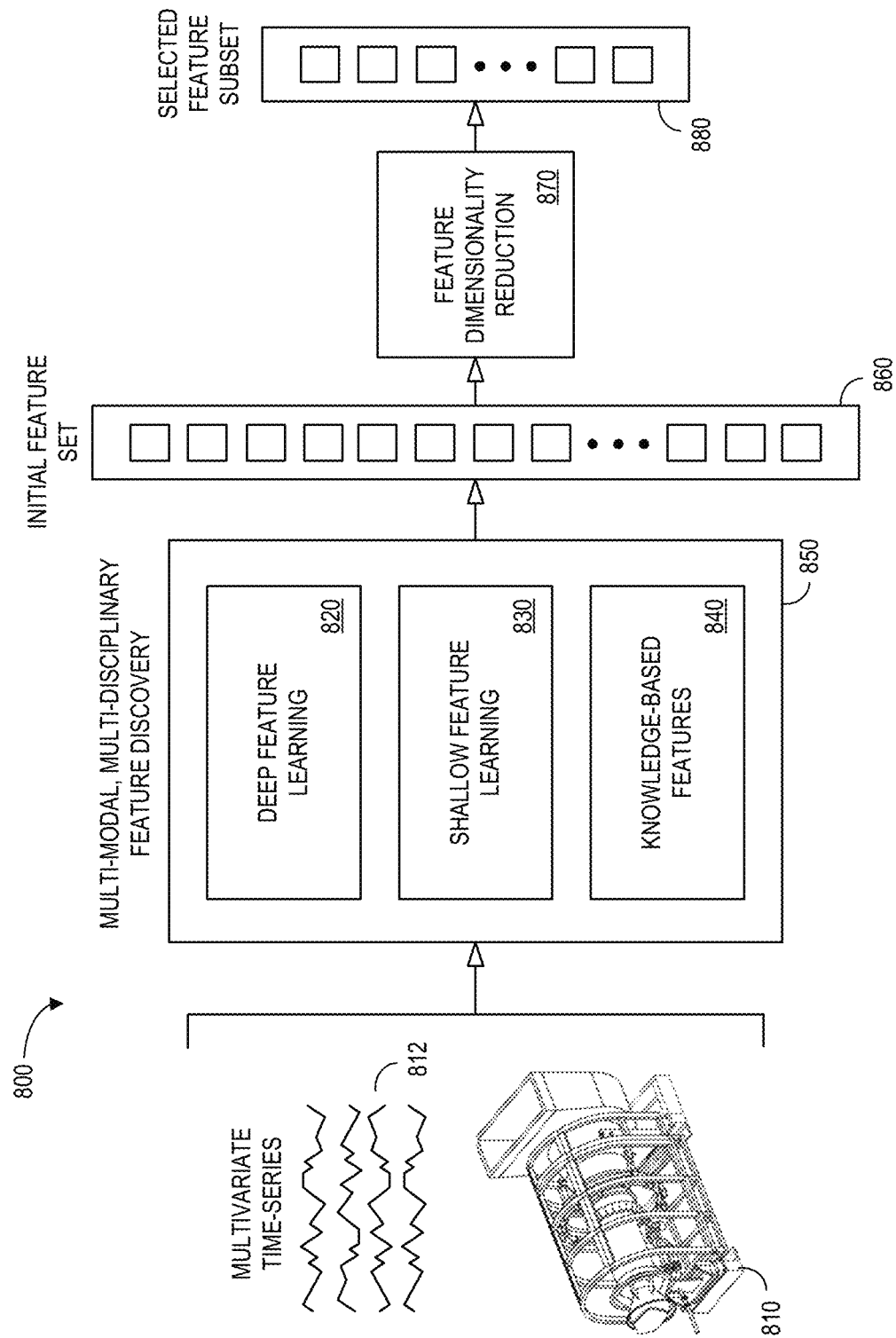
FIG. 8 is a feature vector information flow diagram in accordance with some embodiments.

FIG. 8 is a feature vector information flow diagram 800 wherein a heterogeneous set of data sources are associated with an industrial asset 810. The data sources might include, for example, multivariate time-series information 812 (e.g., from sensor nodes) that is provided to MMMD feature discovery 850 which generates an initial feature set 860. The MMMD feature discovery 850 might include, according to some embodiments, deep feature learning 820, shallow feature learning 830, and/or knowledge-based features 840. Because the initial feature set 860 might be relatively large, a feature dimensionality reduction process 870 may be utilized to create a selected feature subset 880.

The information flow diagram 800 may achieve improved detection performance by maximally leveraging information from both conventional sensor data (e.g., sensor measurements from gas turbines) and unconventional data through multi-modal, multi-disciplinary feature discovery 850. Given the heterogeneous data types, the system may extract features from each individual data source using different feature extraction methods and then combine the results to create the initial feature set 860 (this "combining" process is often referred as "feature fusion" in machine learning and data-mining domains). Because the initial feature set 860 is likely substantially large, the system then applies feature dimensionality reduction 870 techniques to reduce the number of features to a reasonable level before the selected feature subset 880 is used by an anomaly detection engine.

Note that the MMMD feature discovery 850 may include some or all of knowledge-based feature 840 engineering, shallow feature learning 830, and deep feature learning 820. Knowledge-based feature 840 engineering may use domain or engineering knowledge of gas turbine 810 physics to create features from different sensor measurements. These features might simply be statistical descriptors (e.g., maximum, minimum, mean, variance, different orders of moments, etc.) calculated over a window of a time-series signal and its corresponding Fast Fourier Transformation ("FFT") spectrum as well. The knowledge-based features 840 might also utilize a power system analysis, such as basis vector decomposition, state estimation, network observability matrices, topology matrices, system plant matrices, frequency domain features and system poles and zeros. These analyses may represent a characterization of the current gas turbine 810 operation through steady-state, transient, and small signal behaviors.

Although knowledge-based feature 840 engineering is a traditional approach for feature extraction, it is often a laborious, manual process. The approach is also very application specific, and therefore not generalizable or scalable. Learning features directly from data (e.g., via machine learning) may address these issues. For example, shallow feature learning 830 techniques include many unsupervised learning (e.g., k-means clustering), manifold learning and nonlinear embedding (e.g., isomap methods and Locally-Linear Embedding ("LLE")), low-dimension projection (e.g., Principal Component Analysis ("PCA") and Independent Component Analysis ("ICA")), and/or neural networks (e.g., Self-Organizing Map ("SOM") techniques). Other examples of shallow feature learning 830 techniques include genetic programming and sparse coding. The deep feature learning 820 may represent a sub-field of machine learning that involves learning good representations of data through multiple levels of abstraction. By hierarchically learning features layer by layer, with higher-level features representing more abstract aspects of the data, deep feature learning 820 can discover sophisticated underlying structure and features.

The multi-modal, multi-disciplinary feature discovery 850 (or "extraction") will most likely lead to a large number of features in the initial feature set 860. Moreover, many redundant features may exist. Directly using such a large number of features may be burdensome for down-stream anomaly detection models. As a result, feature dimensionality reduction 870 may reduce the number of features by removing redundant information while maximally preserving useful information of the features. Embodiments described herein may be associated with feature selection and/or feature transformation techniques.

By combining knowledge-based feature 850 engineering and advanced deep feature learning 820 techniques (and applying those to different data sources), the MMMD feature discovery 850 framework may be effective in discovering a feature set that provides accurate and reliable threat detection. Note that the framework is generic (and can be used effectively for other analytics applications) and flexible in handling situations where the numbers and the types of available data sources vary from system to system.

Figure 9:
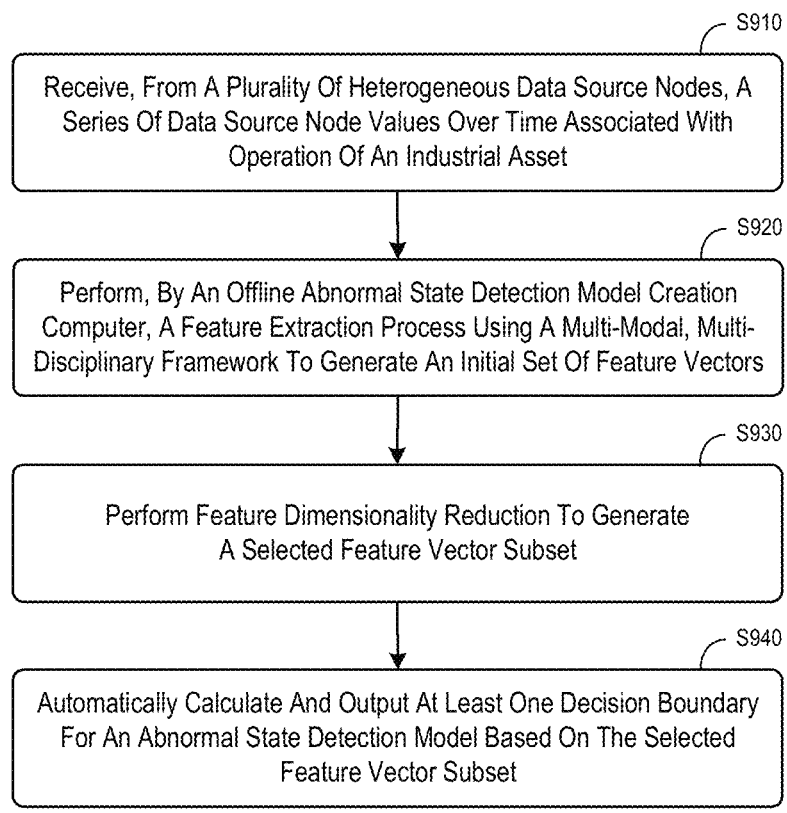
FIG. 9 is a method for creating a selected feature subset according to some embodiments.

FIG. 9 is a method for creating a selected feature subset according to some embodiments. At S910, the system may receive, from a plurality of heterogeneous monitoring nodes, a series of monitoring node values over time associated with operation of an industrial asset. One example of a data source is sensor data, such as data from critical sensor nodes of the industrial asset, actuator nodes of the industrial asset, controller nodes of the industrial asset, key software nodes of the industrial asset, data from switches, etc. Note that the received series of monitoring node values might include normal and abnormal monitoring node values.

At S920, the system may perform a feature extraction process using a multi-modal, multi-disciplinary framework to generate an initial set of feature vectors. According to some embodiments, the feature extraction process may be performed in connection with an offline abnormal state detection model creation computer and/or MMMD feature discovery. The feature extraction process may be further associated with a shallow feature learning technique, such as unsupervised learning, k-means clustering, manifold learning, non-linear embedding, an isomap method, LLE, low-dimension projection, PCA, ICA, neural networks, a SOM method, genetic programming, and/or sparse coding. According to some embodiments, the feature extraction process is associated with a deep feature learning technique and/or a knowledge-based features technique. Some examples of knowledge-based features techniques are associated with statistical descriptors, such as a maximum value, a minimum value, a mean, variance data, different orders of moments, and/or FFT spectrum information. Other examples of knowledge based features techniques are associated with a power system analysis including basis vector decomposition, state estimation, network observability matrices, topology matrices, system plant matrices, frequency domain features, system poles, and/or system zeros.

At S930, the system may perform a feature dimensionality reduction process to generate a selected feature vector subset. According to some embodiments, the feature dimensionality reduction process may be associated with a feature selection technique and/or a feature transformation technique. At S940, the system may automatically calculate and output at least one decision boundary for an abnormal state detection model based on the selected feature vector subset. According to some embodiments, the selected feature vector subset is further used in connection with anomaly detection, anomaly accommodation, anomaly forecasting, and/or system diagnosis.

Figure 10:
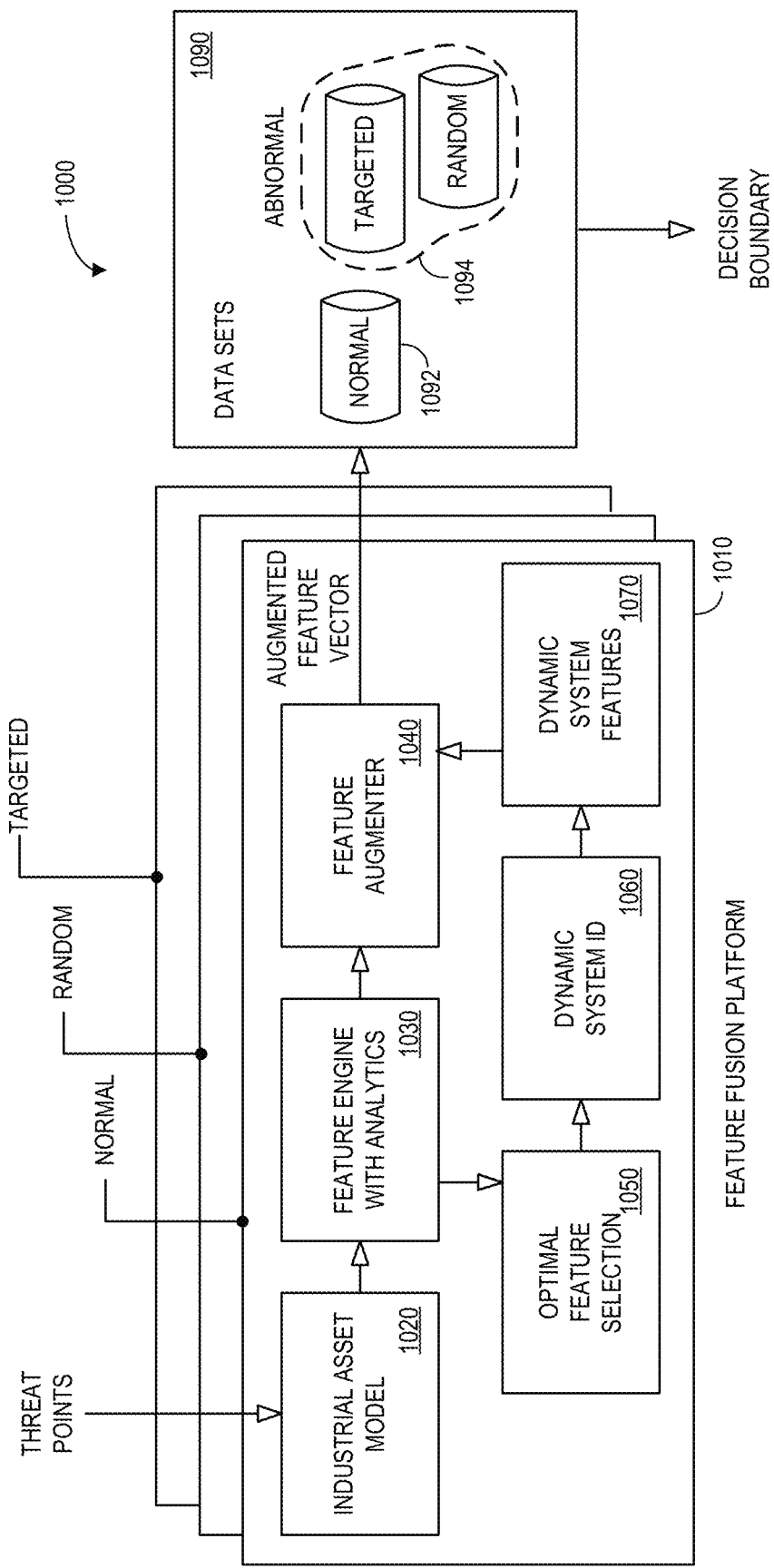
FIG. 10 illustrates a system to create a decision boundary in accordance with some embodiments.

FIG. 10 illustrates a system 1000 to create a decision boundary in accordance with some embodiments. The system 1000 may be associated with a data-driven model-based feature fusion approach. In particular, a feature fusion platform 1010 receives threat point information and generates data sets 1090. The data sets 1090 might include, for example, normal data 1092 and abnormal data 1094 (e.g., targeted data and random data) and may be used to generate at least one decision boundary (e.g., separating normal gas turbine behavior from abnormal gas turbine behavior). Note that the feature fusion platform 1010 may execute in connection with normal data, random data, and/or targeted data.

The threat point information may be processed by an industrial asset model 1020 to create virtual sensor data that is provided to a feature engine with analytics 1030. The feature engine with analytics 1030 provides data to a feature augmenter 1040 and an optimal feature selection element 1050. A dynamic system identification element 1160 may receive information from the optimal feature selection element 1050 and provide data to dynamic system features 1070. The feature augmenter 1040 may then use information from both the feature engine with analytics 1030 and the dynamic systems features 1070 to create augmented feature vectors for the data sets 1090.

According to some embodiments, the dynamic system identification 1060 algorithm may receive a feature vector computed by the feature engine 1030. Then, an optimal subset 1050 of the features suitable for dynamic modeling is selected. The optimal feature selection algorithm 1050 may take the variation and sensitivity of the features (as well as computational efficiency and sparsity structure) into account. This step may help develop a tractable solution for feature evolution for dynamic modeling. The selected features may then be used for dynamic modeling using state space system identification methods.

According to some embodiments, the dynamic state space model of features may be represented as:

$$x[k+1]=Ax[k]+Bw[k]$$

$$y[k]=Cx[k]+Dv[k]$$

where A, B, C, and D are the state space matrices, y is the measurement vector (i.e., computed features vector), x is the vector of states, and v and w are exogenous disturbances (process and measurement noise, respectively). The process noise may represent model uncertainty and the measurement noise may represent numerical errors in feature extractions. The C matrix may be taken as identity (C=1), so the system states would be the same as features (subject to measurement noise). This may provide observability for a model with probability one (assuming zero-mean measurement noise) and improve the numerical efficiency and convergence properties of the system identification.

Once the dynamic model for feature evolution is identified, the properties of the dynamic model (such as stability margins and modal observability margins) may be extracted as additional features. These margins may indicate the distance of individual features to become unstable or unobservable, which is an indication of potential anomalies. These additional features (features of the features) may be sent to the feature augmenter 1040 to be used collectively in decision boundary computations.

Some embodiments described herein may include additional domain-level features. A MMMD feature discovery framework may be employed to generate features from different monitoring. The MMMD feature discovery framework may be considered a data-driven methodology, covering the use of features from data-driven/parameterized dynamic models (e.g., parameters of the transfer function or poles and zeros), logical features and mathematical combinations of different variables. Such approaches may not cover the use of control functions (i.e., controllers or relationships between output (or states) that generate control inputs) that are embedded inside the feedback loop controlling the asset. Since such MMMD frameworks may offer abilities to incorporate any number of features, in addition to incorporating engineered features from monitoring, features connected with the controller functions can further improve detection performance and make it more sensitive to subtle abnormalities.

Figure 11:
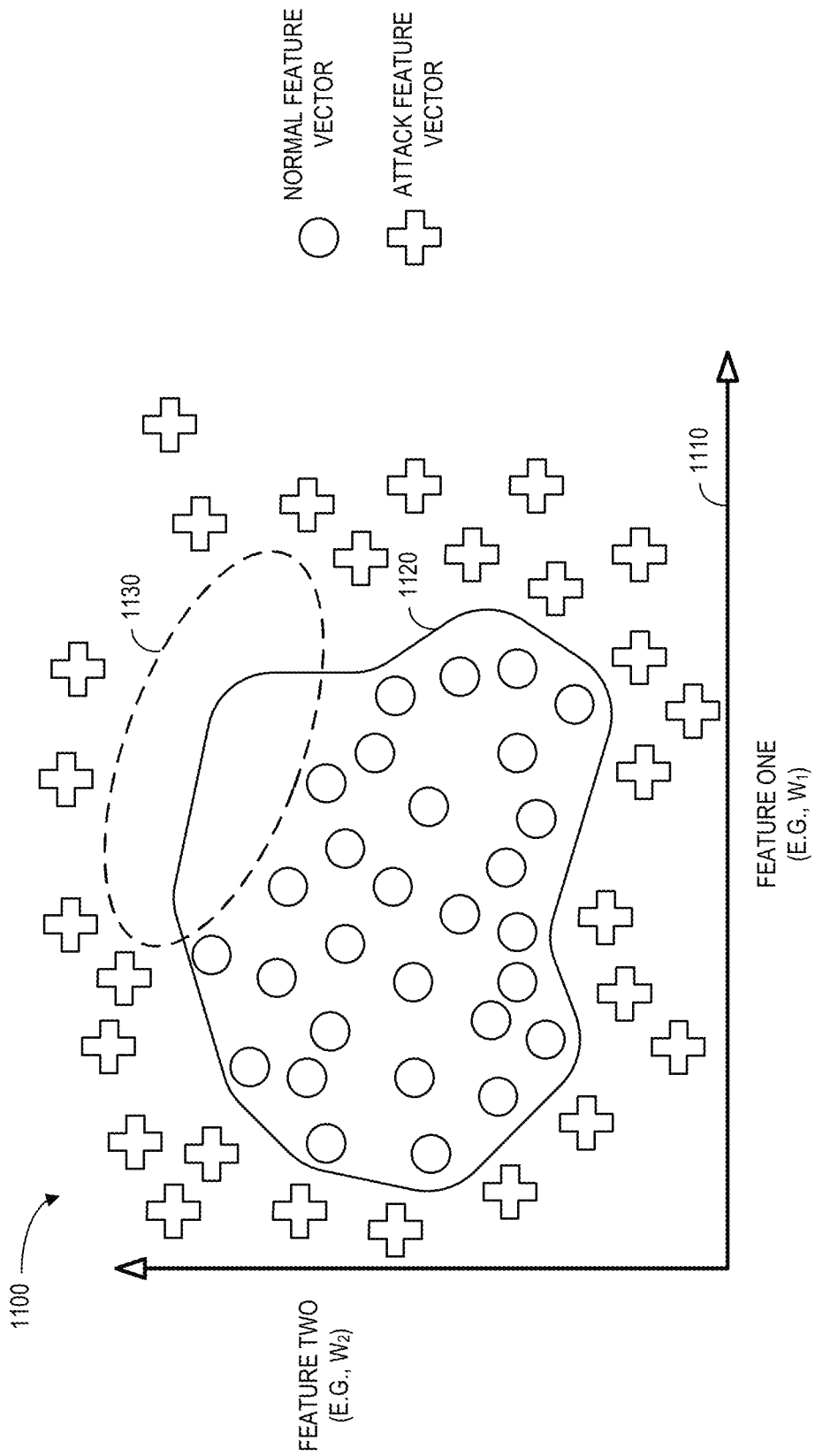
FIG. 11 is a schematic view of a decision boundary separating attack data from normal data set with region containing incomplete training data in accordance with some embodiments.

Note that a DoE methodology may be used to run various potential attack/operational scenarios. Full factorial, Taguchi screening, Central Composite or Box-Behnken are some of the known design methodologies that will be used to create attack space. Attacks near the decision boundary are important to the success of this technology. Large attacks are not required, as they are far away from the decision boundary. For large-scale industrial systems, such as the gas/steam turbines, Heat Recovery Steam Generator ("HRSG"), gas turbine, etc., with hundreds to thousands of factors affecting the behavior, it may become impractical to run DoE scenarios for all possible combinations of attack/operational scenarios. For example, FIG. 11 is a schematic view 1100 of a region likely to be left out while running various attack/operational scenarios (i.e., regions without data for boundary computation). In particular, a two-dimensional feature space is graphed 1110 includes a decision manifold or boundary 1120 dividing normal space (within the boundary 1120) from attack space (outside the boundary 1120. As illustrated by the region 1130 (illustrated by a dashed line in FIG. 11), the can be areas of the feature space were no data is available (that is, there are no normal or abnormal examples within the region 1130). It would therefore be desirable to include domain level control system features in addition to engineered features from monitoring.

Figure 12:
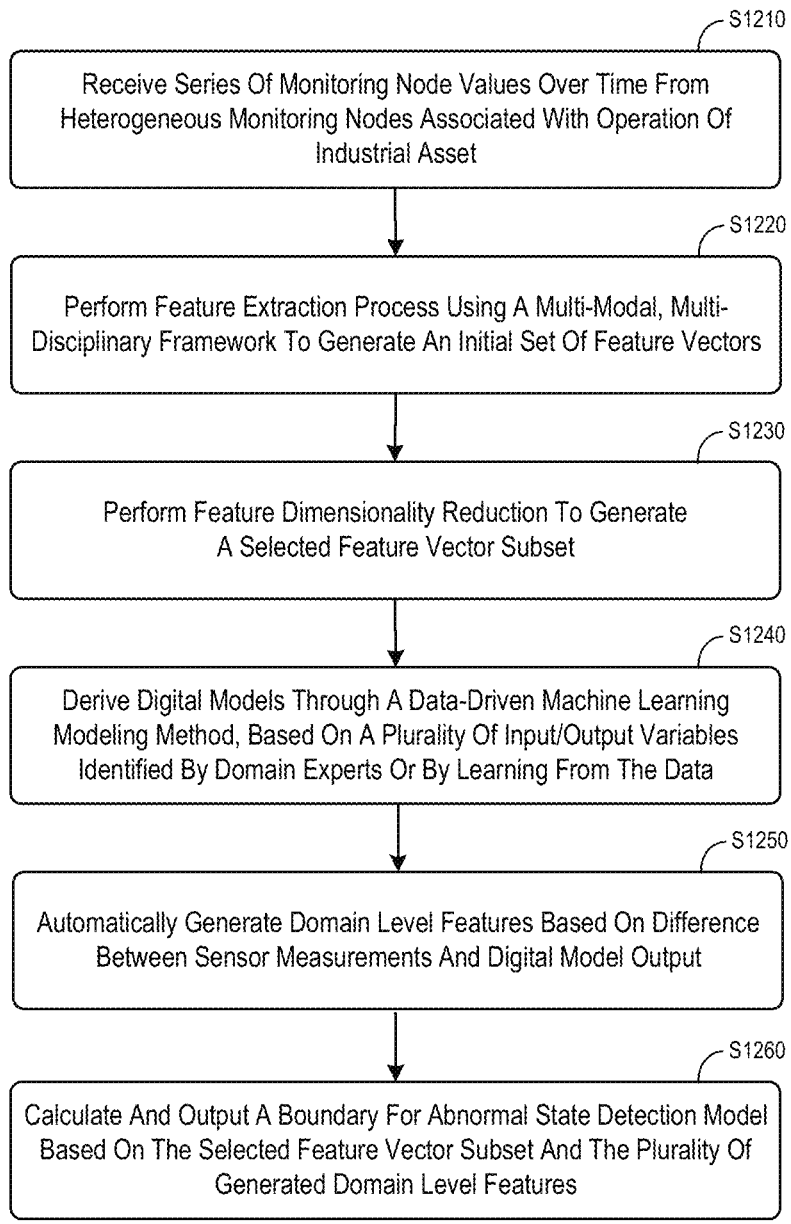
FIG. 12 illustrates a method of protecting an industrial asset according to some embodiments.

FIG. 12 illustrates a method of protecting an industrial asset according to some embodiments. At S1210, an offline abnormal state detection model creation computer may receive a series of monitoring node values over time from a plurality of heterogeneous monitoring nodes associated with operation of the industrial asset. At S1220, the system may perform a feature extraction process using a multi-modal, multi-disciplinary framework to generate an initial set of feature vectors. At S1230, the system may perform feature dimensionality reduction to generate a selected feature vector subset.

At S1240, the system may derive digital models through a data-driven machine learning modeling method, based on input/output variables identified by domain experts or by learning from the data. In some cases, the variables may be associated with various functional groups. The functional groups may represent, for example, functional groups in a control system of the industrial asset to model dominant controller functions. According to some embodiments, the dominant controller functions are embedded inside a feedback loop controlling the industrial asset. Note that the dominant controller functions may represent controllers or relationships between outputs or states that generate control inputs. As will be described, the derivation in S1240 may be associated with a correlation heat map across a plurality of the heterogeneous monitoring nodes.

At S1250, the system may automatically generate domain level features based on a difference between sensor measurements and digital model outputs. Note that the data-driven machine learning models might be trained using a normal data set and a decision boundary might be calculated using both the normal data set and an abnormal data set. At S1260, the system may automatically calculate and output at least one decision boundary for an abnormal state detection model based on the selected feature vector subset and the plurality of generated domain level features. Note that the at least one decision boundary might be automatically calculated based on a plurality of generated domain level features directly and/or residuals of the plurality of generated domain level features.

Figure 13:
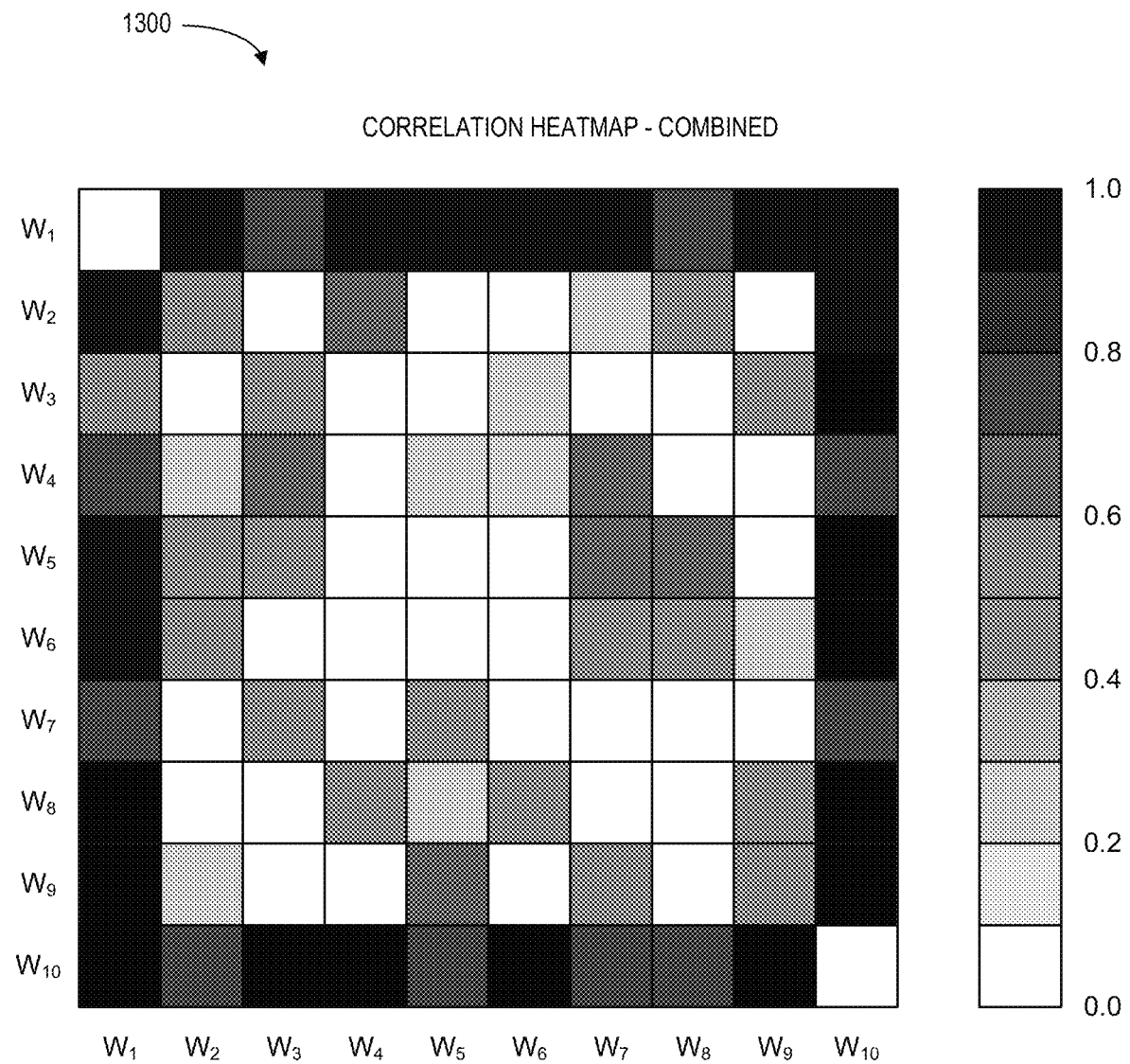
FIG. 13 is a correlation heat map across monitoring nodes for combined attack and normal data sets according to some embodiments.

Some examples will now be provided in connection with a Gas Turbine ("GT") industrial asset (but embodiments are not limited to such). Initially, key domain level features may be found. The system may create a pool of qualified threat vectors (i.e., factors) for a gas turbine system for running attack/operational scenarios using DoE methodology. Examples of factors may include temperatures, speeds, pressures, power, etc. The system might, for example, record signals (sampled at once per second) for 5 minutes in each of the DoE runs for 10 monitoring nodes (e.g., 6 physical sensor nodes, 2 actuator nodes, and 2 control algorithm nodes). A correlation heat map 1300 across combinations of these monitoring nodes may then be generated as illustrated in FIG. 13 (for factors $W_1$ through $W_{10}$). After careful review of this heat map the following three functional groups in the control system might be selected to model the dominant controller functions:

Global: $\{W_H, W_I, W_J, W_K\} = f(W_A, W_B, W_C, W_D, W_E, W_F, W_G)$;

Group 2: $\{W_W\} = f_2(W_X, W_Y, W_Z)$; and

Group 3: $\{W_4\} = f_3(W_1, W_2, W_3)$.

Thus, these three equations may represent the three control system domains of a gas turbine: Global, Group 2, and Group 3, respectively.

Figure 14:
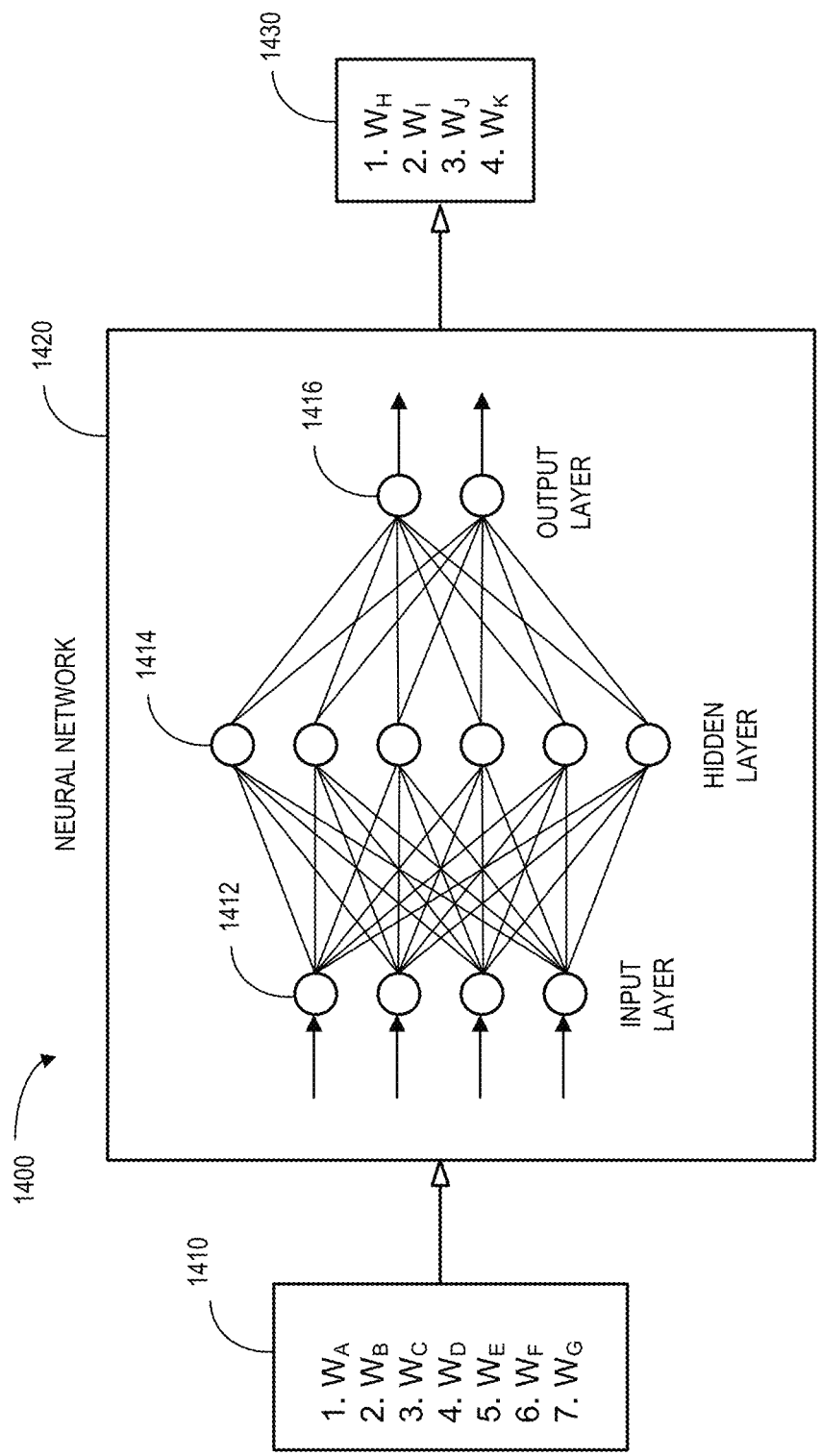
FIG. 14 is a neural network model structure for function $f_1$ according to some embodiments.

Next, the system may derive these three functions through data-driven machine learning modeling method, i.e., learning the functional relationship from the simulation data. While there are a number of machine learning modeling methods available, as one example, the system might utilize neural network methods as the learning model to derive the functions. FIG. 14 show neural network model structures corresponding to functions $f_1$ (and similar networks may be defined for $f_2$, and $f_3$). In particular, FIG. 14 illustrates 1400 inputs 1410 of $f_1$ being provided to neural network 1420 (including an input layer 1412, a hidden layer 1414, and an output layer 1416) which in turn creates an output (namely, $W_H$, $W_I$, $W_J$, and $W_K$).

According to some embodiments, a comparison can be made between predicted and measured output as well as the prediction errors in terms of Mean Absolute Percentage Error ("MAPE") corresponding to these three functions. It is worth noting that the three neural network models could be trained and tested based on the normal data set only. However, training can be done with both normal and attack data set, if the models provide values for other quantities not used in the monitoring nodes.

With the three functions being properly derived through neural network modeling, the system may construct features in a number of different ways: one way might directly use the outputs of the neural network models as features while another might use the residuals as the features (that is, the difference between the neural network outputs and the measured output corresponding to each input). Such obtained domain-level features may then be combined with the data-driven features and used as inputs to a detection engine in accordance with any of the embodiments described herein.

The extensions to features with domain-level functions may help overcome limitations of the solely data-driven approach, especially when normal and attack spaces are not fully explored during training stage. Some embodiments may also provide a good framework to incorporate actual control functions into features when access to such functions is available (e.g., gas turbines). The method may be applicable to any new asset from any Original Equipment Manufacturer ("OEM") provider since time series signals can be used to construct the domain-specific controller function models.

Some advantages associated with embodiments described herein may include: a flexible ability to generate features for any number/type of monitoring directly from control functions embedded in the system; making detection more sensitive to load transients (e.g., load sweeps), and providing accurate feature evolution by capturing dynamics of the system. Moreover, embodiment may be associated with an analytics application for an industrial asset modeling and/or monitoring portfolio of applications.

Figure 15:
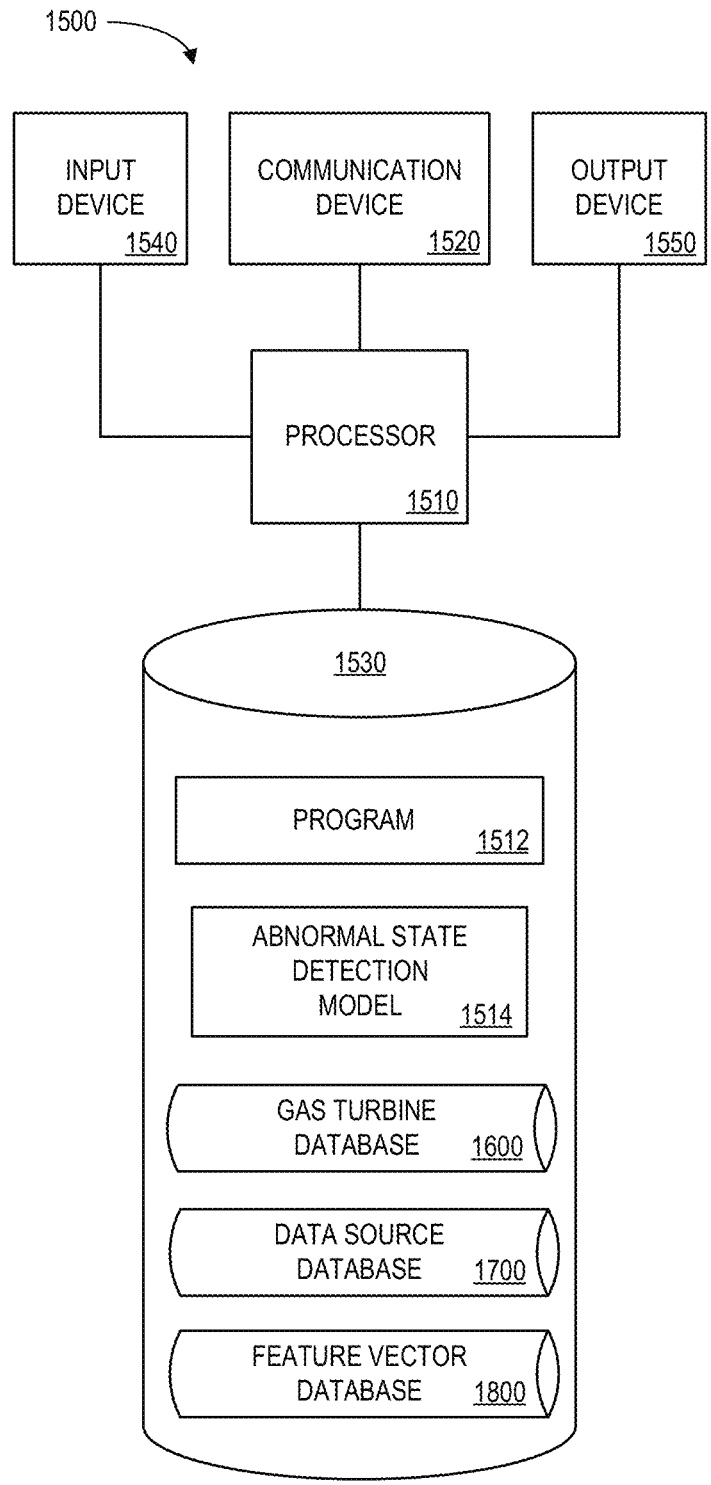
FIG. 15 is a block diagram of an industrial asset protection platform according to some embodiments of the present invention.

The embodiments described herein may be implemented using any number of different hardware configurations. For example, FIG. 15 is a block diagram of an industrial asset protection platform 1500 that may be, for example, associated with the system 100 of FIG. 1. The industrial asset protection platform 1500 comprises a processor 1510, such as one or more commercially available Central Processing Units ("CPUs") in the form of one-chip microprocessors, coupled to a communication device 1520 configured to communicate via a communication network (not shown in FIG. 15). The communication device 1520 may be used to communicate, for example, with one or more remote monitoring nodes, user platforms, etc. The industrial asset protection platform 1500 further includes an input device 1540 (e.g., a computer mouse and/or keyboard to input gas turbine information) and/an output device 1550 (e.g., a computer monitor to render a display, provide alerts, transmit recommendations, and/or create reports). According to some embodiments, a mobile device, monitoring physical system, and/or PC may be used to exchange information with the industrial asset protection platform 1500.

The processor 1510 also communicates with a storage device 1530. The storage device 1530 may comprise any appropriate information storage device, including combinations of magnetic storage devices (e.g., a hard disk drive), optical storage devices, mobile telephones, and/or semiconductor memory devices. The storage device 1530 stores a program 1512 and/or an abnormal state detection model 1514 for controlling the processor 1510. The processor 1510 performs instructions of the programs 1512, 1514, and thereby operates in accordance with any of the embodiments described herein. For example, the processor 1510 may receive, from a plurality of heterogeneous monitoring nodes, a series of monitoring node values over time associated with operation of an industrial asset. The processor 1510 may then perform a feature extraction process to generate an initial set of feature vectors. A feature selection process may be performed with a multi-model, multi-disciplinary framework by the processor 1510 to generate a selected feature vector subset. The processor 1510 may also identify domain level feature functions associated with functional groups and automatically derive the domain level feature functions through a data-driven machine learning modeling method. A decision boundary may then be automatically calculated and output for an abnormal state detection model based on the selected feature vector subset and the plurality of derived domain level feature functions. Note that a set of feature vectors might include normal feature vectors and/or abnormal feature vectors. For example, in some cases only normal feature vectors might be used along with unsupervised learning algorithms to construct a decision boundary. In such scenarios, abnormal feature vectors might not be used. Another option may be to use synthetically generated abnormal data values by injecting false data into normal data values and the use the normal and abnormal values in the abnormal state detection model creation computer.

The programs 1512, 1514 may be stored in a compressed, uncompiled and/or encrypted format. The programs 1512, 1514 may furthermore include other program elements, such as an operating system, clipboard application, a database management system, and/or device drivers used by the processor 1510 to interface with peripheral devices.

As used herein, information may be "received" by or "transmitted" to, for example: (i) the industrial asset protection platform 1500 from another device; or (ii) a software application or module within the industrial asset protection platform 1500 from another software application, module, or any other source.

In some embodiments (such as the one shown in FIG. 15), the storage device 1530 further stores a gas turbine database 1600, data source database 1700, and a feature vector database 1800. Examples of databases that may be used in connection with the industrial asset protection platform 1500 will now be described in detail with respect to FIGS. 16 through 18. Note that the databases described herein are only examples, and additional and/or different information may be stored therein. Moreover, various databases might be split or combined in accordance with any of the embodiments described herein.

Figure 16:
FIG. 16 is a tabular portion of a gas turbine database in accordance with some embodiments.

Referring to FIG. 16, a table is shown that represents the gas turbine database 1600 that may be stored at the industrial asset protection platform 1000 according to some embodiments. The table may include, for example, entries identifying components associated with an industrial asset. The table may also define fields 1602, 1604, 1606 for each of the entries. The fields 1602, 1604, 1606 may, according to some embodiments, specify: a gas turbine identifier 1602, a component identifier 1604, and description 1606. The gas turbine database 1600 may be created and updated, for example, off line (non-real time) when a new industrial asset is monitored or modeled.

The gas turbine identifier 1602 may be, for example, a unique alphanumeric code identifying an industrial asset to be monitored. The component identifier 1604 might be associated with an element of the gas turbine and the description 1606 might describe the component (e.g., sensor type, controller type, actuator type). The gas turbine database 1600 might further store, according to some embodiments, connections between components (e.g., defining a topology of the asset), component statuses, etc. According to some embodiments, the information in the gas turbine database may be used in connection with knowledge-based features and/or an industrial asset model.

Figure 17:
FIG. 17 is a tabular portion of data source database in accordance with some embodiments.

Referring to FIG. 17, a table is shown that represents the data source database 1700 that may be stored at the industrial asset protection platform 1000 according to some embodiments. The table may include, for example, entries identifying data sources associated with an industrial asset. The table may also define fields 1702, 1704, 1706 for each of the entries. The fields 1702, 1704, 1706 may, according to some embodiments, specify: a data source identifier 1702, a time series of data values 1704, and description 1706. The data source database 1700 may be created and updated, for example, based on information received from heterogeneous sensors.

The data source identifier 1702 may be, for example, a unique alphanumeric code identifying a data source that might provide information to be monitored to protect an industrial asset. The time series of values 1704 might be associated with a set of numbers being reported by a particular sensor (e.g., representing airflow, temperatures, etc.) and the description 1706 might describe the type of information being monitored. The data source database 1700 might further store, according to some embodiments, other information such as a gas turbine identifier or component identifier (e.g., which might be based on or associated with the gas turbine identifier 1602 and component identifier 1604 described with respect to the gas turbine database 1600 of FIG. 16). According to some embodiments, information from the data source database 1700 may be provided as inputs to MMMD feature discovery 850 of FIG. 8.

Referring to FIG. 18, a table is shown that represents the feature vector database 1800 that may be stored at the industrial asset protection platform 1000 according to some embodiments. The table may include, for example, entries identifying industrial assets being analyzed by a MMMD framework. The table may also define fields 1802, 1804, 1806, 1808 for each of the entries. The fields 1802, 1804, 1806 may, according to some embodiments, specify: a gas turbine identifier 1802, an initial feature set 1804, a selected feature subset 1806, and a feature type 1808. The feature vector database 1800 may be created and updated, for example, offline when an industrial asset is newly added or modified.

The gas turbine identifier 1802 may be, for example, a unique alphanumeric code identifying an industrial asset to be monitored (and may be based on, or associated with, the gas turbine identifier 1602 in the gas turbine database 1600). The initial feature set 1804 may represent values associated with the initial feature set 960 created by the MMMD feature discovery 850 of FIG. 8. The selected feature subset 1806 may represent values associated with the selected feature subset 880 created by the feature dimensionality reduction 870 of FIG. 8. The selected feature subset 1806 may be used, according to some embodiments, to separate normal behavior from abnormal behavior for an industrial asset. The feature type 1808 might indicate if a feature is domain level, data-driven, etc.

Note that cyber security is an important function required in the protection of assets, such as gas turbine equipment. Dynamic normalization in this space may improve the resolution of detection. The machines associated with gas turbines can be very complex, and embodiments described herein may permit an implementation of a cyber security algorithm that makes detections fast and reliably. Note that a Receiver Operating Conditions ("ROC") curve might be used to evaluate the use of dynamic normalization for load fluctuations (e.g., including indications of true and false positive detections, true and false negative detections, etc.).

Thus, the hybrid data-driven, model-based approach described herein may reduce limitations associated with a solely data-driven (e.g., being memory-less) and solely model-based (e.g., not being scalable to very large dimensions) approaches by combining the two worlds into a unified and integrated framework. Moreover, embodiments may provide large-scale learning for an industrial asset. Given the complexity of a gas turbine system, and heterogeneous data sources from conventional sensors and unconventional sensors, such as cyber sensors, data can be substantially large and dissimilar. Embodiments described herein may facilitate learning features from such a large dataset and effectively reduce the number of features. Moreover, features with dynamic components may be computed so that an augmented set includes both static and dynamic feature set information in one large augmented feature vector.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 19:
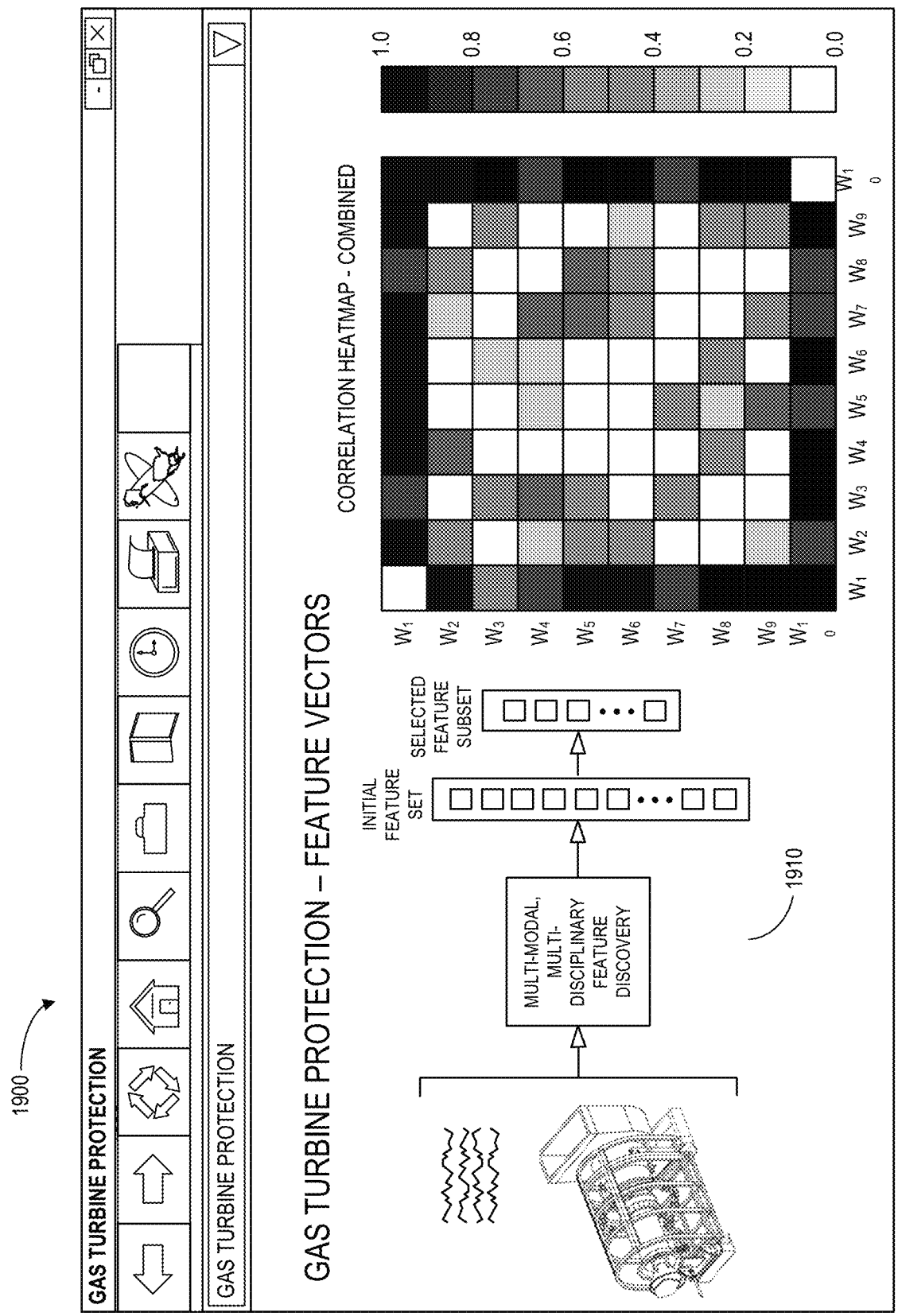
FIG. 19 is a display according to some embodiments.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on gas turbine assets, any of the embodiments described herein could be applied to other types of assets, such as dams, power grids, wind farms, etc. Moreover, note that some embodiments may be associated with a display of information to an operator. For example, FIG. 19 illustrates an interactive Graphical User Interface ("GUI") display 1900 that might display information about an industrial asset 1910 (e.g., including an initial set of feature vectors, a selected feature vector subset, and a correlation heatmap to help identify domain level features). According to some embodiments, information about feature vectors and/or attack statuses may be interwoven between different gas turbines. For example, one gas turbine might be aware of the status of other nodes (in other gas turbines) and such an approach might help thwart coordinated cyber-threats.

In addition to automatic threat detection, some embodiments described herein might provide systems with an additional cyber layer of defense and be deployable without custom programming (e.g., when using operating data). Some embodiments may be sold with a license key and could be incorporated as monitoring service. For example, feature vectors and/or boundaries might be periodically updated when equipment in a gas turbine or other industrial asset is upgraded.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to protect an industrial asset, comprising:
a plurality of heterogeneous monitoring nodes each generating a series of monitoring node values over time associated with operation of the industrial asset, wherein each monitoring node is a hardware sensor including one of a Remote Terminal Unit (RTU), a Phasor Measurement Unit (PMU), a micro-PMU, a Digital Fault Recorder (DFR) and a smart meter, and the monitoring node values are received by controllers as part of a feedback loop controlling the industrial asset and operation of the industrial asset is modified in response to a relation of the received monitoring node values to at least one decision boundary for an abnormal state detection model, wherein the monitoring node generating the received monitoring node values is associated with a plurality of monitoring node-specific decision boundaries for the abnormal state detection model; and
an offline abnormal state detection model creation computer recorded on a non-transitory computer-readable storage medium, coupled to the heterogeneous monitoring nodes, to:
(i) receive the series of monitoring node values and perform a feature extraction process using a physics-based model of a multi-modal, multi-disciplinary framework to generate an initial set of feature vectors, wherein the multi-modal, multi-disciplinary framework includes feature engineering and feature augmenting,
(ii) identify a dynamic model of a time evolution of the initial set of feature vectors, the dynamic model including a plurality of state space matrices,
(iii) extract stability and observability margin properties of the dynamic model as additional features and augment the initial set of feature vectors with the additional features, wherein the augmented set of feature vectors contains both static and dynamic features, and (1) the stability margin properties indicate potential anomalies based on a confidence interval and a distance of individual features to become unstable and (2) the model observability margin properties indicate potential anomalies based on the confidence interval and a distance of individual features to become unobservable,
(iv) perform feature dimensionality reduction on the augmented set of feature vectors to generate a selected feature vector subset,
(v) derive digital models through a data-driven machine learning modeling method, based on a plurality of input/output variables,
(vi) automatically generate domain level features based on a difference between sensor measurements and digital model output, and
(vii) automatically calculate and output at least one decision boundary for an abnormal state detection model based on the selected feature vector subset and the plurality of generated domain level features.

2. The system of claim 1, wherein data-driven machine learning models are trained using a non-anomalous data set.

3. The system of claim 2, wherein the decision boundary is calculated using both the non-anomalous data set and an anomalous data set.

4. The system of claim 1, wherein a plurality of functional groups represents functional groups in a control system of the industrial asset to model dominant controller functions.

5. The system of claim 4, wherein the dominant controller functions are embedded inside a feedback loop controlling the industrial asset.

6. The system of claim 5, wherein the dominant controller functions represent controllers or relationships between outputs or states that generate control inputs.

7. The system of claim 1, wherein said identification is associated with a correlation heat map across a plurality of the heterogeneous monitoring nodes.

8. The system of claim 1, wherein the at least one decision boundary is automatically calculated based on at least one of: (i) the plurality of generated domain level features directly, and (ii) residuals of the plurality of generated domain levels.

9. The system of claim 1, wherein the offline abnormal state detection model creation computer is further to perform a feature dimensionality reduction process to generate the selected feature vector subset.

10. The system of claim 1, wherein the feature dimensionality reduction is further associated with a shallow feature learning technique.

11. The system of claim 10, wherein the shallow feature learning technique utilizes at least one of: (i) unsupervised learning, (ii) k-means clustering, (iii) manifold learning, (iv) non-linear embedding, (v) an isomap method, (vi) Locally-Linear Embedding ("LLE"), (vii) low-dimension projection, (viii) Principal Component Analysis ("PCA"), (ix) Independent Component Analysis ("ICA"), (x) neural networks, (xi) a Self-Organizing Map ("SOM") method, (xii) genetic programming, and (xiii) sparse coding.

12. The system of claim 1, wherein the feature dimensionality reduction is further associated with a deep feature learning technique associated with at least one of: (i) an auto-encoder, (ii) a de-noising auto-encoder, and (iii) a restricted Boltzmann machine.

13. The system of claim 1, wherein the selected feature vector subset is further used in connection with at least one of: (i) anomaly detection, (ii) anomaly accommodation, (iii) anomaly forecasting, and (iv) system diagnosis.

14. The system of claim 1, further comprising:
a real-time threat detection computer, coupled to the plurality of heterogeneous monitoring nodes, to:

(i) receive a series of current monitoring node values and generate a set of current feature vectors based on the offline feature creation process, (ii) access the abnormal state detection model having the at least one decision boundary created offline, and (iii) execute the abnormal state detection model and transmit an abnormal state alert signal based on the set of current feature vectors and the at least one decision boundary.

15. The system of claim 14, wherein the abnormal state detection model is associated with at least one of: (i) an actuator attack, (ii) a controller attack, (iii) a monitoring node attack, (iv) a plant state attack, (v) spoofing, (vi) physical damage, (vii) unit availability, (viii) a unit trip, (ix) a loss of unit life, and (x) asset damage requiring at least one new part.

16. The system of claim 14, wherein the abnormal state detection model including the at least one decision boundary is associated with at least one of: (i) a line, (ii) a hyperplane, and (iii) a non-linear boundary separating normal space and abnormal space.

17. The system of claim 1, wherein the initial set of feature vectors is generated via at least one of a deep feature learning, shallow feature learning and knowledge-based features.

18. The system of claim 1, wherein an origin of a threat is localized to a first monitoring node based on a comparison of a first time at which the decision boundary associated with the first monitoring node is crossed as compared to a second time at which the decision boundary associated with a second monitoring node was crossed.

19. A computerized method to protect an industrial asset, comprising:

receiving, by an offline abnormal state detection model creation computer, a series of monitoring node values over time from a plurality of heterogeneous monitoring nodes associated with operation of the industrial asset, wherein each monitoring node is a sensor including one of a Remote Terminal Unit (RTU), a Phasor Measurement Unit (PMU), a micro-PMU, a Digital Fault Recorder (DFR), and a smart meter, and the monitoring node values are received by controllers as part of a feedback loop controlling the industrial asset and operation of the industrial asset is modified in response to a relation of the received monitoring node values to at least one decision boundary for an abnormal state detection model, wherein the monitoring node generating the received monitoring node values is associated with a plurality of monitoring node-specific decision boundaries for the abnormal state detection model;

performing a feature extraction process using a physics-based model of a multi-modal, multi-disciplinary framework to generate an initial set of feature vectors, wherein the multi-modal, multi-disciplinary framework includes feature engineering and feature augmenting;

identifying a dynamic model of a time evolution of the initial set of feature vectors, the dynamic model including a plurality of state space matrices;

extracting stability and observability margin properties of the dynamic model as additional features and augmenting the initial set of feature vectors with the additional features, wherein the augmented set of feature vectors contains both static and dynamic features, and (1) the stability margin properties indicate potential anomalies based on a confidence interval and a distance of individual features to become unstable and (2) the model observability margin properties indicate potential anomalies based on the confidence interval and a distance of individual features to become unobservable;

performing feature dimensionality reduction on the augmented set of feature vectors to generate a selected feature vector subset;

deriving digital models through a data-driven, machine learning modeling method, based on a plurality of input/output variables;

automatically generating domain level features based on a difference between sensor measurements and digital model output; and automatically calculating and outputting at least one decision boundary for an abnormal state detection model based on the selected feature vector subset and the plurality of generated domain level features.

20. A non-transitory, computer-readable medium storing instructions that, when executed by a computer processor, cause the computer processor to perform a method to protect an industrial asset, the method comprising:

receiving, by an offline abnormal state detection model creation computer, a series of monitoring node values over time from a plurality of heterogeneous monitoring nodes associated with operation of the industrial asset, wherein each monitoring node is a sensor including one of a Remote Terminal Unit (RTU), a Phasor Measurement Unit (PMU), a micro-PMU, a Digital Fault Recorder (DFR) and a smart meter, and the monitoring node values are received by controllers as part of a feedback loop controlling the industrial asset and operation of the industrial asset is modified in response to a relation of the received monitoring node values to at least one decision boundary for an abnormal state detection model, wherein the monitoring node generating the received monitoring node values is associated with a plurality of monitoring node-specific decision boundaries for the abnormal state detection model;

performing a feature extraction process using a physics-based model of a multi-modal, multi-disciplinary framework to generate an initial set of feature vectors, wherein the multi-modal, multi-disciplinary framework includes feature engineering and feature augmenting;

identifying a dynamic model of a time evolution of the initial set of feature vectors, the dynamic model including a plurality of state space matrices;

extracting stability and observability margin properties of the dynamic model as additional features and augmenting the initial set of feature vectors with the additional features, wherein the augmented set of feature vectors contains both static and dynamic features, and (1) the stability margin properties indicate potential anomalies based on a confidence interval and a distance of individual features to become unstable and (2) the model observability margin properties indicate potential anomalies based on the confidence interval and a distance of individual features to become unobservable;

performing feature dimensionality reduction on the augmented set of feature vectors to generate a selected feature vector subset;

deriving digital models through a data-driven machine learning modeling method, based on a plurality of input/output variables;

automatically generating domain level features based on a difference between sensor measurements and digital model output; and automatically calculating and outputting at least one decision boundary for an abnormal state detection model based on the selected feature vector subset and the plurality of generated domain level features.

* * * * *